(12) United States Patent
Kuwahara

(10) Patent No.: US 7,044,663 B2
(45) Date of Patent: May 16, 2006

(54) PRINT METHOD AND SYSTEM TO OBTAIN HIGH QUALITY IMAGE USING LESS DATA QUANTITY

(75) Inventor: Soichi Kuwahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/495,907

(22) PCT Filed: Nov. 15, 2002

(86) PCT No.: PCT/JP02/11971

§ 371 (c)(1),
(2), (4) Date: May 19, 2004

(87) PCT Pub. No.: WO03/045049

PCT Pub. Date: May 30, 2003

(65) Prior Publication Data

US 2005/0073701 A1    Apr. 7, 2005

(30) Foreign Application Priority Data

Nov. 21, 2001  (JP) ............................. 2001-356527

(51) Int. Cl.
*B41J 11/44* (2006.01)
*H04N 1/40* (2006.01)
(52) U.S. Cl. ....................................... 400/76; 358/3.08
(58) Field of Classification Search .................. 400/76; 382/266, 258, 270; 358/3.06, 3.08, 3.26, 358/1.15, 1.13, 1.9
See application file for complete search history.

(56) References Cited

U.S. PATENT DOCUMENTS

| | | | |
|---|---|---|---|
| 5,493,419 A | 2/1996 | Jodoln et al. | 358/3.08 |
| 5,499,305 A * | 3/1996 | Lidke et al. | 382/270 |
| 5,748,798 A * | 5/1998 | Nakai et al. | 382/258 |
| 6,009,193 A | 12/1999 | Mita | 382/168 |
| 6,163,629 A | 12/2000 | Cheung et al. | 382/260 |
| 6,285,800 B1 * | 9/2001 | Yamazaki et al. | 382/266 |
| 6,538,762 B1 * | 3/2003 | Terashima et al. | 358/1.15 |

(Continued)

FOREIGN PATENT DOCUMENTS

EP    0 422 588    4/1991

(Continued)

OTHER PUBLICATIONS

Handbook of Print Media, Helmut Kipphan, Spring 2001, p. 82.*

*Primary Examiner*—Andrew H. Hirshfeld
*Assistant Examiner*—Wasseem H. Hamdan
(74) *Attorney, Agent, or Firm*—Robert J. Depke; Trexler, Bushnell, Giangiorgi, Blackstone & Marr, Ltd.

(57) ABSTRACT

A printer is permitted to obtain printed matter of high picture quality from print data transferred in the state changed into 1 bit for the purpose of shortening data transfer time. A multi-value conversion unit (23) converts CMYK respective 1 bit binary data from an expansion unit (22) into multi-valued data. The multi-value conversion unit sets values that a remarked pixel should take, which corresponds to circumstances of surrounding pixels, in a table where two gradation data (0, 1) of the remarked pixel and two gradation data of pixels around the remarked pixel, e.g., upper and lower, left and right and oblique eight pixels are assigned to respective digits of binary number of eight figures are taken as parameter to make reference to this table to thereby convert two gradation data into multi-valued data.

3 Claims, 48 Drawing Sheets

U.S. PATENT DOCUMENTS

2003/0090730 A1 * 5/2003 Shimamura ................ 358/3.06

FOREIGN PATENT DOCUMENTS

| JP | 3-273456 A | 12/1991 |
| JP | 6-506323 A | 7/1994 |
| JP | 8-154174 A | 6/1996 |
| JP | 2002-237944 A | 8/2002 |

* cited by examiner

| A | B | B(BINARY NUMBER) | T[A][B] |
|---|---|---|---|
| 0 | 0 | 0 0 0 0 0 0 0 0 | 0 |
| 0 | 1 | 0 0 0 0 0 0 0 1 | 0 |
| 0 | 2 | 0 0 0 0 0 0 1 0 | 0 |
| 0 | 3 | 0 0 0 0 0 0 1 1 | 0 |
| 0 | 4 | 0 0 0 0 0 1 0 0 | 0 |
| 0 | 5 | 0 0 0 0 0 1 0 1 | 0 |
| 0 | 6 | 0 0 0 0 0 1 1 0 | 0 |
| 0 | 7 | 0 0 0 0 0 1 1 1 | 0 |
| 0 | 8 | 0 0 0 0 1 0 0 0 | 0 |
| 0 | 9 | 0 0 0 0 1 0 0 1 | 0 |
| 0 | 1 0 | 0 0 0 0 1 0 1 0 | 0 |
| 0 | 1 1 | 0 0 0 0 1 0 1 1 | 0 |
| 0 | 1 2 | 0 0 0 0 1 1 0 0 | 0 |
| 0 | 1 3 | 0 0 0 0 1 1 0 1 | 0 |
| 0 | 1 4 | 0 0 0 0 1 1 1 0 | 0 |
| 0 | 1 5 | 0 0 0 0 1 1 1 1 | 0 |
| 0 | 1 6 | 0 0 0 1 0 0 0 0 | 0 |
| 0 | 1 7 | 0 0 0 1 0 0 0 1 | 0 |
| 0 | 1 8 | 0 0 0 1 0 0 1 0 | 0 |
| 0 | 1 9 | 0 0 0 1 0 0 1 1 | 0 |
| 0 | 2 0 | 0 0 0 1 0 1 0 0 | 0 |
| 0 | 2 1 | 0 0 0 1 0 1 0 1 | 0 |

Fig.5

| A | B | B(BINARY NUMBER) | T[A][B] |
|---|---|---|---|
| 0 | 22 | 00010110 | 0 |
| 0 | 23 | 00010111 | 0 |
| 0 | 24 | 00011000 | 0 |
| 0 | 25 | 00011001 | 0 |
| 0 | 26 | 00011010 | 0 |
| 0 | 27 | 00011011 | 0 |
| 0 | 28 | 00011100 | 0 |
| 0 | 29 | 00011101 | 0 |
| 0 | 30 | 00011110 | 0 |
| 0 | 31 | 00011111 | 0 |
| 0 | 32 | 00100000 | 0 |
| 0 | 33 | 00100001 | 0 |
| 0 | 34 | 00100010 | 0 |
| 0 | 35 | 00100011 | 0 |
| 0 | 36 | 00100100 | 0 |
| 0 | 37 | 00100101 | 0 |
| 0 | 38 | 00100110 | 0 |
| 0 | 39 | 00100111 | 0 |
| 0 | 40 | 00101000 | 0 |
| 0 | 41 | 00101001 | 0 |
| 0 | 42 | 00101010 | 0 |

Fig. 6

| A | B | B(BINARY NUMBER) | T[A][B] |
|---|---|---|---|
| 0 | 43 | 00101011 | 0 |
| 0 | 44 | 00101100 | 0 |
| 0 | 45 | 00101101 | 0 |
| 0 | 46 | 00101110 | 0 |
| 0 | 47 | 00101111 | 0 |
| 0 | 48 | 00110000 | 0 |
| 0 | 49 | 00110001 | 0 |
| 0 | 50 | 00110010 | 0 |
| 0 | 51 | 00110011 | 0 |
| 0 | 52 | 00110100 | 0 |
| 0 | 53 | 00110101 | 0 |
| 0 | 54 | 00110110 | 0 |
| 0 | 55 | 00110111 | 0 |
| 0 | 56 | 00111000 | 0 |
| 0 | 57 | 00111001 | 0 |
| 0 | 58 | 00111010 | 0 |
| 0 | 59 | 00111011 | 0 |
| 0 | 60 | 00111100 | 0 |
| 0 | 61 | 00111101 | 0 |
| 0 | 62 | 00111110 | 0 |
| 0 | 63 | 00111111 | 0 |

Fig.7

| A | B | B(BINARY NUMBER) | T[A][B] |
|---|---|---|---|
| 0 | 64 | 01000000 | 0 |
| 0 | 65 | 01000001 | 0 |
| 0 | 66 | 01000010 | 0 |
| 0 | 67 | 01000011 | 0 |
| 0 | 68 | 01000100 | 0 |
| 0 | 69 | 01000101 | 0 |
| 0 | 70 | 01000110 | 0 |
| 0 | 71 | 01000111 | 0 |
| 0 | 72 | 01001000 | 0 |
| 0 | 73 | 01001001 | 0 |
| 0 | 74 | 01001010 | 0 |
| 0 | 75 | 01001011 | 0 |
| 0 | 76 | 01001100 | 0 |
| 0 | 77 | 01001101 | 0 |
| 0 | 78 | 01001110 | 0 |
| 0 | 79 | 01001111 | 0 |
| 0 | 80 | 01010000 | 0 |
| 0 | 81 | 01010001 | 0 |
| 0 | 82 | 01010010 | 0 |
| 0 | 83 | 01010011 | 0 |
| 0 | 84 | 01010100 | 0 |
| 0 | 85 | 01010101 | 0 |

Fig.8

| A | B | B(BINARY NUMBER) | T[A][B] |
|---|---|---|---|
| 0 | 86 | 01010110 | 0 |
| 0 | 87 | 01010111 | 0 |
| 0 | 88 | 01011000 | 0 |
| 0 | 89 | 01011001 | 0 |
| 0 | 90 | 01011010 | 1 |
| 0 | 91 | 01011011 | 1 |
| 0 | 92 | 01011100 | 0 |
| 0 | 93 | 01011101 | 0 |
| 0 | 94 | 01011110 | 1 |
| 0 | 95 | 01011111 | 1 |
| 0 | 96 | 01100000 | 0 |
| 0 | 97 | 01100001 | 0 |
| 0 | 98 | 01100010 | 0 |
| 0 | 99 | 01100011 | 0 |
| 0 | 100 | 01100100 | 0 |
| 0 | 101 | 01100101 | 0 |
| 0 | 102 | 01100110 | 0 |
| 0 | 103 | 01100111 | 0 |
| 0 | 104 | 01101000 | 0 |
| 0 | 105 | 01101001 | 0 |
| 0 | 106 | 01101010 | 0 |

Fig. 9

| A | B | B(BINARY NUMBER) | T[A][B] |
|---|---|---|---|
| 0 | 107 | 0 1 1 0 1 0 1 1 | 0 |
| 0 | 108 | 0 1 1 0 1 1 0 0 | 0 |
| 0 | 109 | 0 1 1 0 1 1 0 1 | 0 |
| 0 | 110 | 0 1 1 0 1 1 1 0 | 0 |
| 0 | 111 | 0 1 1 0 1 1 1 1 | 0 |
| 0 | 112 | 0 1 1 1 0 0 0 0 | 0 |
| 0 | 113 | 0 1 1 1 0 0 0 1 | 0 |
| 0 | 114 | 0 1 1 1 0 0 1 0 | 0 |
| 0 | 115 | 0 1 1 1 0 0 1 1 | 0 |
| 0 | 116 | 0 1 1 1 0 1 0 0 | 0 |
| 0 | 117 | 0 1 1 1 0 1 0 1 | 0 |
| 0 | 118 | 0 1 1 1 0 1 1 0 | 0 |
| 0 | 119 | 0 1 1 1 0 1 1 1 | 0 |
| 0 | 120 | 0 1 1 1 1 0 0 0 | 0 |
| 0 | 121 | 0 1 1 1 1 0 0 1 | 0 |
| 0 | 122 | 0 1 1 1 1 0 1 0 | 1 |
| 0 | 123 | 0 1 1 1 1 0 1 1 | 1 |
| 0 | 124 | 0 1 1 1 1 1 0 0 | 0 |
| 0 | 125 | 0 1 1 1 1 1 0 1 | 0 |
| 0 | 126 | 0 1 1 1 1 1 1 0 | 1 |
| 0 | 127 | 0 1 1 1 1 1 1 1 | 1 |

Fig.10

| A | B | B(BINARY NUMBER) | T[A][B] |
|---|---|---|---|
| 0 | 128 | 10000000 | 0 |
| 0 | 129 | 10000001 | 0 |
| 0 | 130 | 10000010 | 0 |
| 0 | 131 | 10000011 | 0 |
| 0 | 132 | 10000100 | 0 |
| 0 | 133 | 10000101 | 0 |
| 0 | 134 | 10000110 | 0 |
| 0 | 135 | 10000111 | 0 |
| 0 | 136 | 10001000 | 0 |
| 0 | 137 | 10001001 | 0 |
| 0 | 138 | 10001010 | 0 |
| 0 | 139 | 10001011 | 0 |
| 0 | 140 | 10001100 | 0 |
| 0 | 141 | 10001101 | 0 |
| 0 | 142 | 10001110 | 0 |
| 0 | 143 | 10001111 | 0 |
| 0 | 144 | 10010000 | 0 |
| 0 | 145 | 10010001 | 0 |
| 0 | 146 | 10010010 | 0 |
| 0 | 147 | 10010011 | 0 |
| 0 | 148 | 10010100 | 0 |
| 0 | 149 | 10010101 | 0 |

Fig.11

| A | B | B(BINARY NUMBER) | T[A][B] |
|---|---|---|---|
| 0 | 150 | 10010110 | 0 |
| 0 | 151 | 10010111 | 0 |
| 0 | 152 | 10011000 | 0 |
| 0 | 153 | 10011001 | 0 |
| 0 | 154 | 10011010 | 0 |
| 0 | 155 | 10011011 | 0 |
| 0 | 156 | 10011100 | 0 |
| 0 | 157 | 10011101 | 0 |
| 0 | 158 | 10011110 | 0 |
| 0 | 159 | 10011111 | 0 |
| 0 | 160 | 10100000 | 0 |
| 0 | 161 | 10100001 | 0 |
| 0 | 162 | 10100010 | 0 |
| 0 | 163 | 10100011 | 0 |
| 0 | 164 | 10100100 | 0 |
| 0 | 165 | 10100101 | 0 |
| 0 | 166 | 10100110 | 0 |
| 0 | 167 | 10100111 | 0 |
| 0 | 168 | 10101000 | 0 |
| 0 | 169 | 10101001 | 0 |
| 0 | 170 | 10101010 | 0 |

Fig.12

| A | B | B(BINARY NUMBER) | T[A][B] |
|---|---|---|---|
| 0 | 171 | 10101011 | 0 |
| 0 | 172 | 10101100 | 0 |
| 0 | 173 | 10101101 | 0 |
| 0 | 174 | 10101110 | 0 |
| 0 | 175 | 10101111 | 0 |
| 0 | 176 | 10110000 | 0 |
| 0 | 177 | 10110001 | 0 |
| 0 | 178 | 10110010 | 0 |
| 0 | 179 | 10110011 | 0 |
| 0 | 180 | 10110100 | 0 |
| 0 | 181 | 10110101 | 0 |
| 0 | 182 | 10110110 | 0 |
| 0 | 183 | 10110111 | 0 |
| 0 | 184 | 10111000 | 0 |
| 0 | 185 | 10111001 | 0 |
| 0 | 186 | 10111010 | 0 |
| 0 | 187 | 10111011 | 0 |
| 0 | 188 | 10111100 | 0 |
| 0 | 189 | 10111101 | 0 |
| 0 | 190 | 10111110 | 0 |
| 0 | 191 | 10111111 | 0 |

Fig.13

| A | B | B(BINARY NUMBER) | T[A][B] |
|---|---|---|---|
| 0 | 192 | 11000000 | 0 |
| 0 | 193 | 11000001 | 0 |
| 0 | 194 | 11000010 | 0 |
| 0 | 195 | 11000011 | 0 |
| 0 | 196 | 11000100 | 0 |
| 0 | 197 | 11000101 | 0 |
| 0 | 198 | 11000110 | 0 |
| 0 | 199 | 11000111 | 0 |
| 0 | 200 | 11001000 | 0 |
| 0 | 201 | 11001001 | 0 |
| 0 | 202 | 11001010 | 0 |
| 0 | 203 | 11001011 | 0 |
| 0 | 204 | 11001100 | 0 |
| 0 | 205 | 11001101 | 0 |
| 0 | 206 | 11001110 | 0 |
| 0 | 207 | 11001111 | 0 |
| 0 | 208 | 11010000 | 0 |
| 0 | 209 | 11010001 | 0 |
| 0 | 210 | 11010010 | 0 |
| 0 | 211 | 11010011 | 0 |
| 0 | 212 | 11010100 | 0 |
| 0 | 213 | 11010101 | 0 |

Fig.14

| A | B | B(BINARY NUMBER) | T[A][B] |
|---|---|---|---|
| 0 | 214 | 11010110 | 0 |
| 0 | 215 | 11010111 | 0 |
| 0 | 216 | 11011000 | 0 |
| 0 | 217 | 11011001 | 0 |
| 0 | 218 | 11011010 | 1 |
| 0 | 219 | 11011011 | 1 |
| 0 | 220 | 11011100 | 0 |
| 0 | 221 | 11011101 | 0 |
| 0 | 222 | 11011110 | 1 |
| 0 | 223 | 11011111 | 1 |
| 0 | 224 | 11100000 | 0 |
| 0 | 225 | 11100001 | 0 |
| 0 | 226 | 11100010 | 0 |
| 0 | 227 | 11100011 | 0 |
| 0 | 228 | 11100100 | 0 |
| 0 | 229 | 11100101 | 0 |
| 0 | 230 | 11100110 | 0 |
| 0 | 231 | 11100111 | 0 |
| 0 | 232 | 11101000 | 0 |
| 0 | 233 | 11101001 | 0 |
| 0 | 234 | 11101010 | 0 |

Fig.15

| A | B | B(BINARY NUMBER) | T[A][B] |
|---|---|---|---|
| 0 | 235 | 1 1 1 0 1 0 1 1 | 0 |
| 0 | 236 | 1 1 1 0 1 1 0 0 | 0 |
| 0 | 237 | 1 1 1 0 1 1 0 1 | 0 |
| 0 | 238 | 1 1 1 0 1 1 1 0 | 0 |
| 0 | 239 | 1 1 1 0 1 1 1 1 | 0 |
| 0 | 240 | 1 1 1 1 0 0 0 0 | 0 |
| 0 | 241 | 1 1 1 1 0 0 0 1 | 0 |
| 0 | 242 | 1 1 1 1 0 0 1 0 | 0 |
| 0 | 243 | 1 1 1 1 0 0 1 1 | 0 |
| 0 | 244 | 1 1 1 1 0 1 0 0 | 0 |
| 0 | 245 | 1 1 1 1 0 1 0 1 | 0 |
| 0 | 246 | 1 1 1 1 0 1 1 0 | 0 |
| 0 | 247 | 1 1 1 1 0 1 1 1 | 0 |
| 0 | 248 | 1 1 1 1 1 0 0 0 | 0 |
| 0 | 249 | 1 1 1 1 1 0 0 1 | 0 |
| 0 | 250 | 1 1 1 1 1 0 1 0 | 1 |
| 0 | 251 | 1 1 1 1 1 0 1 1 | 1 |
| 0 | 252 | 1 1 1 1 1 1 0 0 | 0 |
| 0 | 253 | 1 1 1 1 1 1 0 1 | 0 |
| 0 | 254 | 1 1 1 1 1 1 1 0 | 1 |
| 0 | 255 | 1 1 1 1 1 1 1 1 | 1 |

Fig.16

| A | B | B(BINARY NUMBER) | T[A][B] |
|---|---|---|---|
| 1 | 0 | 0 0 0 0 0 0 0 0 | 1 |
| 1 | 1 | 0 0 0 0 0 0 0 1 | 1 |
| 1 | 2 | 0 0 0 0 0 0 1 0 | 1 |
| 1 | 3 | 0 0 0 0 0 0 1 1 | 1 |
| 1 | 4 | 0 0 0 0 0 1 0 0 | 1 |
| 1 | 5 | 0 0 0 0 0 1 0 1 | 1 |
| 1 | 6 | 0 0 0 0 0 1 1 0 | 1 |
| 1 | 7 | 0 0 0 0 0 1 1 1 | 2 |
| 1 | 8 | 0 0 0 0 1 0 0 0 | 1 |
| 1 | 9 | 0 0 0 0 1 0 0 1 | 1 |
| 1 | 10 | 0 0 0 0 1 0 1 0 | 2 |
| 1 | 11 | 0 0 0 0 1 0 1 1 | 2 |
| 1 | 12 | 0 0 0 0 1 1 0 0 | 1 |
| 1 | 13 | 0 0 0 0 1 1 0 1 | 1 |
| 1 | 14 | 0 0 0 0 1 1 1 0 | 2 |
| 1 | 15 | 0 0 0 0 1 1 1 1 | 2 |
| 1 | 16 | 0 0 0 1 0 0 0 0 | 1 |
| 1 | 17 | 0 0 0 1 0 0 0 1 | 1 |
| 1 | 18 | 0 0 0 1 0 0 1 0 | 2 |
| 1 | 19 | 0 0 0 1 0 0 1 1 | 2 |
| 1 | 20 | 0 0 0 1 0 1 0 0 | 1 |
| 1 | 21 | 0 0 0 1 0 1 0 1 | 1 |

Fig.17

| A | B | B(BINARY NUMBER) | T[A][B] |
|---|---|---|---|
| 1 | 22 | 00010110 | 2 |
| 1 | 23 | 00010111 | 2 |
| 1 | 24 | 00011000 | 1 |
| 1 | 25 | 00011001 | 1 |
| 1 | 26 | 00011010 | 2 |
| 1 | 27 | 00011011 | 2 |
| 1 | 28 | 00011100 | 1 |
| 1 | 29 | 00011101 | 1 |
| 1 | 30 | 00011110 | 2 |
| 1 | 31 | 00011111 | 2 |
| 1 | 32 | 00100000 | 1 |
| 1 | 33 | 00100001 | 1 |
| 1 | 34 | 00100010 | 1 |
| 1 | 35 | 00100011 | 1 |
| 1 | 36 | 00100100 | 1 |
| 1 | 37 | 00100101 | 1 |
| 1 | 38 | 00100110 | 1 |
| 1 | 39 | 00100111 | 2 |
| 1 | 40 | 00101000 | 1 |
| 1 | 41 | 00101001 | 1 |
| 1 | 42 | 00101010 | 2 |

Fig.18

| A | B | B(BINARY NUMBER) | T[A][B] |
|---|---|---|---|
| 1 | 43 | 00101011 | 2 |
| 1 | 44 | 00101100 | 1 |
| 1 | 45 | 00101101 | 2 |
| 1 | 46 | 00101110 | 2 |
| 1 | 47 | 00101111 | 2 |
| 1 | 48 | 00110000 | 1 |
| 1 | 49 | 00110001 | 1 |
| 1 | 50 | 00110010 | 2 |
| 1 | 51 | 00110011 | 2 |
| 1 | 52 | 00110100 | 1 |
| 1 | 53 | 00110101 | 1 |
| 1 | 54 | 00110110 | 2 |
| 1 | 55 | 00110111 | 2 |
| 1 | 56 | 00111000 | 1 |
| 1 | 57 | 00111001 | 2 |
| 1 | 58 | 00111010 | 2 |
| 1 | 59 | 00111011 | 2 |
| 1 | 60 | 00111100 | 1 |
| 1 | 61 | 00111101 | 2 |
| 1 | 62 | 00111110 | 2 |
| 1 | 63 | 00111111 | 2 |

Fig.19

| A | B | B(BINARY NUMBER) | T[A][B] |
|---|---|---|---|
| 1 | 64 | 01000000 | 1 |
| 1 | 65 | 01000001 | 1 |
| 1 | 66 | 01000010 | 1 |
| 1 | 67 | 01000011 | 1 |
| 1 | 68 | 01000100 | 1 |
| 1 | 69 | 01000101 | 1 |
| 1 | 70 | 01000110 | 1 |
| 1 | 71 | 01000111 | 2 |
| 1 | 72 | 01001000 | 2 |
| 1 | 73 | 01001001 | 2 |
| 1 | 74 | 01001010 | 2 |
| 1 | 75 | 01001011 | 2 |
| 1 | 76 | 01001100 | 2 |
| 1 | 77 | 01001101 | 2 |
| 1 | 78 | 01001110 | 2 |
| 1 | 79 | 01001111 | 2 |
| 1 | 80 | 01010000 | 2 |
| 1 | 81 | 01010001 | 2 |
| 1 | 82 | 01010010 | 2 |
| 1 | 83 | 01010011 | 2 |
| 1 | 84 | 01010100 | 2 |
| 1 | 85 | 01010101 | 2 |

Fig.20

| A | B | B(BINARY NUMBER) | T[A][B] |
|---|---|---|---|
| 1 | 86 | 01010110 | 2 |
| 1 | 87 | 01010111 | 2 |
| 1 | 88 | 01011000 | 2 |
| 1 | 89 | 01011001 | 2 |
| 1 | 90 | 01011010 | 3 |
| 1 | 91 | 01011011 | 3 |
| 1 | 92 | 01011100 | 2 |
| 1 | 93 | 01011101 | 2 |
| 1 | 94 | 01011110 | 3 |
| 1 | 95 | 01011111 | 3 |
| 1 | 96 | 01100000 | 1 |
| 1 | 97 | 01100001 | 1 |
| 1 | 98 | 01100010 | 1 |
| 1 | 99 | 01100011 | 1 |
| 1 | 100 | 01100100 | 1 |
| 1 | 101 | 01100101 | 1 |
| 1 | 102 | 01100110 | 2 |
| 1 | 103 | 01100111 | 2 |
| 1 | 104 | 01101000 | 2 |
| 1 | 105 | 01101001 | 2 |
| 1 | 106 | 01101010 | 2 |

Fig. 21

| A | B | B(BINARY NUMBER) | T[A][B] |
|---|---|---|---|
| 1 | 107 | 01101011 | 2 |
| 1 | 108 | 01101100 | 2 |
| 1 | 109 | 01101101 | 2 |
| 1 | 110 | 01101110 | 2 |
| 1 | 111 | 01101111 | 2 |
| 1 | 112 | 01110000 | 2 |
| 1 | 113 | 01110001 | 2 |
| 1 | 114 | 01110010 | 2 |
| 1 | 115 | 01110011 | 2 |
| 1 | 116 | 01110100 | 2 |
| 1 | 117 | 01110101 | 2 |
| 1 | 118 | 01110110 | 2 |
| 1 | 119 | 01110111 | 2 |
| 1 | 120 | 01111000 | 2 |
| 1 | 121 | 01111001 | 2 |
| 1 | 122 | 01111010 | 3 |
| 1 | 123 | 01111011 | 3 |
| 1 | 124 | 01111100 | 2 |
| 1 | 125 | 01111101 | 2 |
| 1 | 126 | 01111110 | 3 |
| 1 | 127 | 01111111 | 3 |

Fig. 22

| A | B | B(BINARY NUMBER) | T[A][B] |
|---|---|---|---|
| 1 | 128 | 10000000 | 1 |
| 1 | 129 | 10000001 | 1 |
| 1 | 130 | 10000010 | 1 |
| 1 | 131 | 10000011 | 1 |
| 1 | 132 | 10000100 | 1 |
| 1 | 133 | 10000101 | 1 |
| 1 | 134 | 10000110 | 1 |
| 1 | 135 | 10000111 | 2 |
| 1 | 136 | 10001000 | 1 |
| 1 | 137 | 10001001 | 1 |
| 1 | 138 | 10001010 | 2 |
| 1 | 139 | 10001011 | 2 |
| 1 | 140 | 10001100 | 1 |
| 1 | 141 | 10001101 | 1 |
| 1 | 142 | 10001110 | 2 |
| 1 | 143 | 10001111 | 2 |
| 1 | 144 | 10010000 | 1 |
| 1 | 145 | 10010001 | 1 |
| 1 | 146 | 10010010 | 2 |
| 1 | 147 | 10010011 | 2 |
| 1 | 148 | 10010100 | 2 |
| 1 | 149 | 10010101 | 2 |

Fig.23

| A | B | B(BINARY NUMBER) | T[A][B] |
|---|---|---|---|
| 1 | 150 | 10010110 | 2 |
| 1 | 151 | 10010111 | 2 |
| 1 | 152 | 10011000 | 1 |
| 1 | 153 | 10011001 | 1 |
| 1 | 154 | 10011010 | 2 |
| 1 | 155 | 10011011 | 2 |
| 1 | 156 | 10011100 | 2 |
| 1 | 157 | 10011101 | 2 |
| 1 | 158 | 10011110 | 2 |
| 1 | 159 | 10011111 | 2 |
| 1 | 160 | 10100000 | 1 |
| 1 | 161 | 10100001 | 1 |
| 1 | 162 | 10100010 | 1 |
| 1 | 163 | 10100011 | 1 |
| 1 | 164 | 10100100 | 1 |
| 1 | 165 | 10100101 | 1 |
| 1 | 166 | 10100110 | 1 |
| 1 | 167 | 10100111 | 2 |
| 1 | 168 | 10101000 | 1 |
| 1 | 169 | 10101001 | 2 |
| 1 | 170 | 10101010 | 2 |

Fig. 24

| A | B | B(BINARY NUMBER) | T[A][B] |
|---|---|---|---|
| 1 | 171 | 1 0 1 0 1 0 1 1 | 2 |
| 1 | 172 | 1 0 1 0 1 1 0 0 | 1 |
| 1 | 173 | 1 0 1 0 1 1 0 1 | 2 |
| 1 | 174 | 1 0 1 0 1 1 1 0 | 2 |
| 1 | 175 | 1 0 1 0 1 1 1 1 | 2 |
| 1 | 176 | 1 0 1 1 0 0 0 0 | 1 |
| 1 | 177 | 1 0 1 1 0 0 0 1 | 1 |
| 1 | 178 | 1 0 1 1 0 0 1 0 | 2 |
| 1 | 179 | 1 0 1 1 0 0 1 1 | 2 |
| 1 | 180 | 1 0 1 1 0 1 0 0 | 2 |
| 1 | 181 | 1 0 1 1 0 1 0 1 | 2 |
| 1 | 182 | 1 0 1 1 0 1 1 0 | 2 |
| 1 | 183 | 1 0 1 1 0 1 1 1 | 2 |
| 1 | 184 | 1 0 1 1 1 0 0 0 | 1 |
| 1 | 185 | 1 0 1 1 1 0 0 1 | 2 |
| 1 | 186 | 1 0 1 1 1 0 1 0 | 2 |
| 1 | 187 | 1 0 1 1 1 0 1 1 | 2 |
| 1 | 188 | 1 0 1 1 1 1 0 0 | 2 |
| 1 | 189 | 1 0 1 1 1 1 0 1 | 2 |
| 1 | 190 | 1 0 1 1 1 1 1 0 | 2 |
| 1 | 191 | 1 0 1 1 1 1 1 1 | 2 |

Fig.25

| A | B | B(BINARY NUMBER) | T[A][B] |
|---|---|---|---|
| 1 | 192 | 11000000 | 1 |
| 1 | 193 | 11000001 | 1 |
| 1 | 194 | 11000010 | 1 |
| 1 | 195 | 11000011 | 1 |
| 1 | 196 | 11000100 | 1 |
| 1 | 197 | 11000101 | 1 |
| 1 | 198 | 11000110 | 1 |
| 1 | 199 | 11000111 | 2 |
| 1 | 200 | 11001000 | 2 |
| 1 | 201 | 11001001 | 2 |
| 1 | 202 | 11001010 | 2 |
| 1 | 203 | 11001011 | 2 |
| 1 | 204 | 11001100 | 2 |
| 1 | 205 | 11001101 | 2 |
| 1 | 206 | 11001110 | 2 |
| 1 | 207 | 11001111 | 2 |
| 1 | 208 | 11010000 | 2 |
| 1 | 209 | 11010001 | 2 |
| 1 | 210 | 11010010 | 2 |
| 1 | 211 | 11010011 | 2 |
| 1 | 212 | 11010100 | 2 |
| 1 | 213 | 11010101 | 2 |

Fig.26

| A | B | B(BINARY NUMBER) | T[A][B] |
|---|---|---|---|
| 1 | 214 | 11010110 | 2 |
| 1 | 215 | 11010111 | 2 |
| 1 | 216 | 11011000 | 2 |
| 1 | 217 | 11011001 | 2 |
| 1 | 218 | 11011010 | 3 |
| 1 | 219 | 11011011 | 3 |
| 1 | 220 | 11011100 | 2 |
| 1 | 221 | 11011101 | 2 |
| 1 | 222 | 11011110 | 3 |
| 1 | 223 | 11011111 | 3 |
| 1 | 224 | 11100000 | 2 |
| 1 | 225 | 11100001 | 2 |
| 1 | 226 | 11100010 | 2 |
| 1 | 227 | 11100011 | 2 |
| 1 | 228 | 11100100 | 2 |
| 1 | 229 | 11100101 | 2 |
| 1 | 230 | 11100110 | 2 |
| 1 | 231 | 11100111 | 2 |
| 1 | 232 | 11101000 | 2 |
| 1 | 233 | 11101001 | 2 |
| 1 | 234 | 11101010 | 2 |

Fig. 27

| A | B | B(BINARY NUMBER) | T[A][B] |
|---|---|---|---|
| 1 | 235 | 11101011 | 2 |
| 1 | 236 | 11101100 | 2 |
| 1 | 237 | 11101101 | 2 |
| 1 | 238 | 11101110 | 2 |
| 1 | 239 | 11101111 | 2 |
| 1 | 240 | 11110000 | 2 |
| 1 | 241 | 11110001 | 2 |
| 1 | 242 | 11110010 | 2 |
| 1 | 243 | 11110011 | 2 |
| 1 | 244 | 11110100 | 2 |
| 1 | 245 | 11110101 | 2 |
| 1 | 246 | 11110110 | 2 |
| 1 | 247 | 11110111 | 2 |
| 1 | 248 | 11111000 | 2 |
| 1 | 249 | 11111001 | 2 |
| 1 | 250 | 11111010 | 3 |
| 1 | 251 | 11111011 | 3 |
| 1 | 252 | 11111100 | 2 |
| 1 | 253 | 11111101 | 2 |
| 1 | 254 | 11111110 | 3 |
| 1 | 255 | 11111111 | 4 |

Fig. 28

| A | B | B(BINARY NUMBER) | T [A] [B] |
|---|---|---|---|
| 0 | 0 | 0 0 0 0 0 0 0 0 | 0 |
| 0 | 1 | 0 0 0 0 0 0 0 1 | 0 |
| ⋮ | ⋮ | ⋮ | ⋮ |
| 0 | 255 | 1 1 1 1 1 1 1 1 | 0 |
| 1 | 0 | 0 0 0 0 0 0 0 0 | 1 |
| 1 | 1 | 0 0 0 0 0 0 0 1 | 2 |
| ⋮ | ⋮ | ⋮ | ⋮ |
| 1 | 90 | 0 1 0 1 1 0 1 0 | 3 |
| ⋮ | ⋮ | ⋮ | ⋮ |
| 1 | 244 | 1 1 1 1 0 1 0 0 | 3 |
| ⋮ | ⋮ | ⋮ | ⋮ |
| 1 | 248 | 1 1 1 1 1 0 0 0 | 3 |
| ⋮ | ⋮ | ⋮ | ⋮ |
| 1 | 255 | 1 1 1 1 1 1 1 1 | 5 |

PRINT METHOD AND SYSTEM TO OBTAIN HIGH QUALITY IMAGE USING LESS DATA QUANTITY

TECHNICAL FIELD

The present invention relates to a printer and a print method which have multi-valued representation ability per one pixel, and relates to a printer, a print method and a print system which can obtain printed matter of high picture quality by less data quantity.

This application claims priority of Japanese Patent Application No. 2001-356527, filed on November, 2001, the entirety of which is incorporated herein.

BACKGROUND ART

Picture quality of printed result (printed matter) required for printer becomes high year by year, and realization of high resolution and realization of multi-valued data are advanced in accordance therewith.

On the other hand, correspondingly thereto, print data becomes vast more and more. For example, data quantity of A4 full size 600 dpi CMYK (cyan, magenta, yellow, black) respective pixel 8 bit becomes equal to as far as about 140 MB. Under such circumstances, it takes much time in data transfer. In view of the above, compression is implemented to such data, or 8 bits are changed into 4 bits or 3 bits to thereby reduce data quantity.

However, even if data quantity is halved by compression and is further changed into 3 bits so that it becomes equal to $3/8$, there still exists data quantity of about 26 MB. As a result, it took much time in data transfer.

In view of the above, when respective pixels are caused to be changed into 1 bit so that data quantity is further halved by compression, data quantity is held down to about 9 MB. Accordingly, it is possible to shorten data transfer time down to satisfactory degree. However, since respective pixels are represented by binary number, it becomes difficult to obtain printed matter of high picture quality.

DISCLOSURE OF THE INVENTION

The present invention is proposed in view of the actual circumstances as described above, and its object is to provide a printer which can obtain printed matter of high picture quality from print data which has been transferred in the state changed into 1 bit for the purpose of shortening data transfer time.

Another object of the present invention is to provide a print method of obtaining printed matter of high picture quality from print data transmitted in the state where data quantity is caused to be 1 bit for the purpose of shortening data transfer time.

A further object of the present invention is to provide a print system which performs data transfer in the state where data quantities of respective pixels are caused to be 1 bit, and which can obtain printed matter of high picture quality from data of 1 bit of respective pixels which have been caused to undergo data transfer.

The printer according to the present invention proposed in order to attain the above-described objects is directed to a printer which can make representation having three gradations or more by one pixel, which comprises multi-value conversion means for converting data of two gradations of a remarked pixel into data of multi-gradation including three gradations or more on the basis of data of pixels around the remarked pixel, and recording head means for performing print operation based on the data of multi-gradation from the multi-value conversion means.

In the printer, values that the remarked pixel should take, which are based on data of surrounding pixels, are set in advance in a table where values in which two gradation data (0, 1) of plural n (n is integer of three or more) pixels around the remarked pixel are assigned to respective digits of binary number of n figures and two gradation data (0, 1) of the remarked pixel are taken as parameter. Thus, the multi-value conversion means makes reference to this table to thereby convert two gradation data into multi-gradation data. For example, n is 8, and eight pixels positioned in upper and lower directions, in left and right directions and in oblique direction of the remarked pixel are caused to be pixels to be converted.

The print method according to the present invention proposed in order to attain the above-described objects is directed to a print method applied to a printer which can make representation having three gradations or more by one pixel, which comprises a multi-value conversion step of converting data of two gradations of the remarked pixel into data of multi-gradation including three gradations or more on the basis of data of pixels around the remarked pixel, and a recording step of performing print operation based on data of multi-gradation from the multi-value conversion step.

In the print method, values that the remarked pixel should take, which are based on data of surrounding pixels, are set in advance in a table where values in which two gradation data (0,1) of plural n (n is integer of 3 or more) around the remarked pixel are assigned to respective digits of binary number of n figures and two gradation data (0, 1) of the remarked pixel are taken as parameter to make reference to the table at the multi-value conversion step to thereby convert two gradation data into multi-gradation data. For example, n is 8, and 8 pixels positioned in the upper and lower directions, in the left and right directions and in oblique direction of the remarked pixel are assumed to be pixels to be converted.

Another printer according to the present invention is directed to a printer adapted for receiving data based on image transferred through transfer means to perform print operation in conformity with that data, which comprises multi-value conversion means for converting data of two gradations of a remarked pixel transferred through the transfer means into data of multi-gradation including three gradations or more on the basis of data of pixels around the remarked pixel, and recording head means for performing print operation based on the data of the multi-gradation from the multi-value conversion means.

Another print method according to the present invention is directed to a print method applied to a printer adapted for receiving data based on image transferred through transfer means to perform print operation in conformity with data, which comprises a multi-value conversion step of converting data of two gradations of a remarked pixel transferred through the transfer means into data of multi-gradation including three gradations or more on the basis of data of pixels around the remarked pixel, and a recording step of performing print operation based on data of multi-gradation from the multi-value conversion step.

The print system according to the present invention is directed to a print system adapted for transferring data based on image to a printer through transfer means to perform print operation in conformity with the data at the printer, wherein image is caused to be data of two gradations per one pixel, and is then transferred to the printer through the transfer means, whereby the printer converts data of two gradations of a remarked pixel into data of multi-gradation including three gradations or more on the basis of data of pixels around the remarked pixel.

In this print system, values that the remarked pixel should take, which are based on data of surrounding pixels, are set in advance in a table where values in which two gradation data (0, 1) of plural n (n is integer of 3 or more) pixels around the remarked pixel are assigned to respective digits of binary number of n figures and two gradation data (0, 1) of the remarked pixel are taken as parameter, whereby multi-value conversion means makes reference to the table to thereby convert two gradation data into multi-gradation data.

In the print system of the present invention, in transmitting recording image data from, e.g., computer device to a printer which can record multi-valued (trinary or more) data, the recording image data is converted into CMYK data on the computer device thereafter to convert it into binary (1 bit) data of respective colors by using error diffusion method, etc. to compress this data or add other information thereto as occasion demand to send the data thus obtained to the printer.

Further, in the multi-value recordable printer, conversion of binary→multi-value is performed by dot arrangement around pixels desired to be recorded to thereby permit multi-value recording.

By using the print method of the present invention, even if original image is data of RGB respective colors 8 bits, such data results in data of CMYK respective colors 1 bit. Accordingly, data quantity can be reduced to much degree. In addition, in performing print operation by printer, there results multi-valued image in place of binary image. Accordingly, print quality can be extremely improved as compared to simple binary image.

In the printer, in conversion of binary→multi-value, values that remarked pixel should take, which corresponds to circumstances of surrounding pixels, are set in table where binary data (0, 1) of the remarked pixel and values in which binary data (0, 1) of eight pixels around (positioned in the upper and lower directions, in left and right directions and in oblique direction) of the remarked pixel are assigned to respective digits of binary number of eight figures are taken as parameter to make reference to this table to thereby convert binary data into multi-valued data, thus making it possible to simplify processing, and making it possible to make setting of high degree of freedom corresponding to surrounding pixels.

As a result, not only conversion of binary→multi-value is performed, but also edge processing such that density is lowered at the contour portion of the solid portion, etc. can be simultaneously performed.

Still further objects of the present invention and practical merits obtained by the present invention will become more apparent from the description of the embodiments which will be given below with reference to the attached drawings.

BRIEF DESCRIPTION OF THE DRAWINGS

FIGS. 5 to 28 are views showing a portion of first practical example of table in which data prepared as the result of preparation of multi-valued data are stored.

BEST MODE FOR CARRYING OUT THE INVENTION

Explanation will now be given with reference to the attached drawings in connection with embodiments of the present invention.

In the embodiments, the present invention is applied to a print system using printer which can represent three gradations or more by one pixel as practical example of a printer and a print method to which the present invention has been applied.

Figure 1:
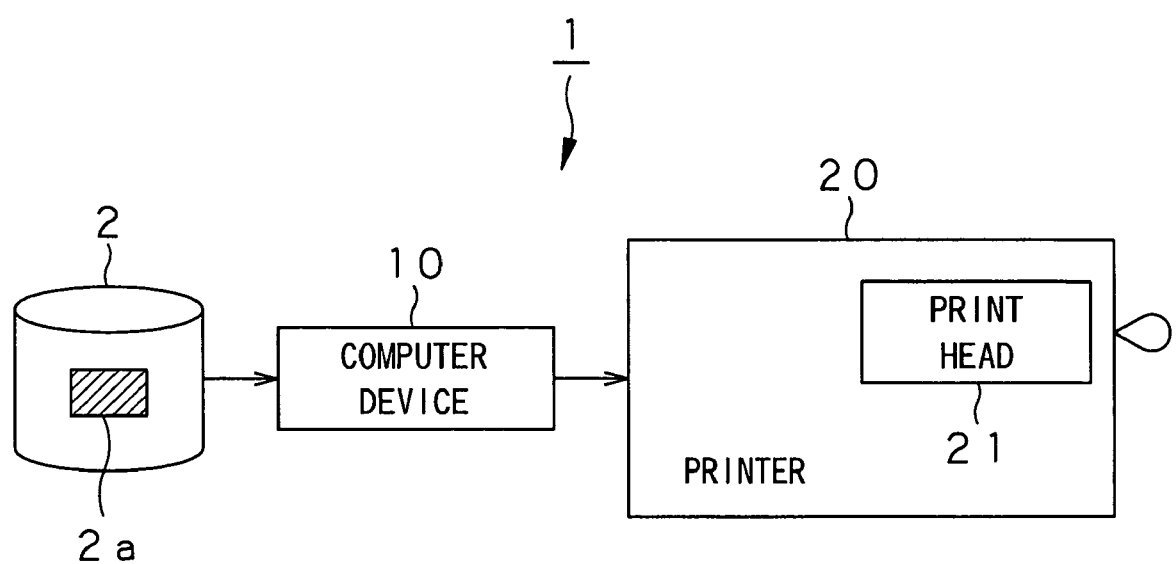
FIG. 1 is a block diagram showing a print system to which the present invention has been applied.

As shown in FIG. 1, this print system 1 comprises a storage unit 2 in which image file 2a consisting of RGB image data, etc. are stored, a computer device 10 for implementing color conversion or γ-correction to the RGB image data of the image file 2a of the storage unit 2, and for implementing binarization data processing, etc. to the color-converted image data, and a printer 20 for converting binary (1 bit) data of respective colors into multi-valued data to have ability to represent three gradations or more per one pixel.

The storage unit 2 is composed of, e.g., hard disc unit or optical disc unit, and serves to read out image file 2a consisting of data of R component, G component and B component (RGB image data) which are recorded on the hard disc or the optical disc, etc. to deliver it to the computer device 10 as original image. It is a matter of course that there may be employed an approach to read out image file from memory means, e.g., memory such as RAM, etc., hard disc or optical disc, etc. included within the computer device 10 in place of the storage unit 2 to reproduce it. Namely, it should be noted that the form of the storage unit 2 in which the image file is preserved is not limited by FIG. 1.

The computer device 10 is composed of, e.g., personal computer (PC). When user gives an instruction to print original image on the computer device 10, the computer device 10 converts the original image from data of RGB respective 256 values into data of CMYK (cyan, magenta, yellow, black) respective 256 values by using three-dimensional look-up table, etc. In this instance, γ-correction is also implemented in conformity with the characteristic of the printer. Data of CMYK 256 respective values are converted into CMYK respective binary data by using well known half-toning technology (error diffusion method, or pattern Dither method, etc.).

The computer device 10 compresses the binarized data in order to further improve transfer efficiency to add information required for performing print operation (information such as the number of papers to be printed, resolution at the time of printing, start position, end of data, and/or new page signal, etc.) to generate print data.

The printer 20 receives the print data which has been caused to undergo data transfer from the computer device 10 to take out information necessary for performing print operation from the print data, and to expand the compressed image data to change it back into CMYK respective binary data.

The printer 20 further converts this binary (binarized) data into, e.g., quinary data on the basis of multi-value conversion method which will be described later. These data are sorted in drive order of the printer head to send it to the printer head to perform print operation.

As interface between the computer device 10 and the printer 20, there may be used, e.g., IEEE Std. 1284 (popularly speaking "Centronics", Bi-Centronics, Small Computer System Interface (popularly speaking "SCSI"), RS-232C or RS-422A, IEEE 1394, Ethernet (registered trade mark), Bluetooth, IEEE 802.11a, IEEE 802.11b, and/or USB (Universal Serial Bus), etc.

Figure 2:
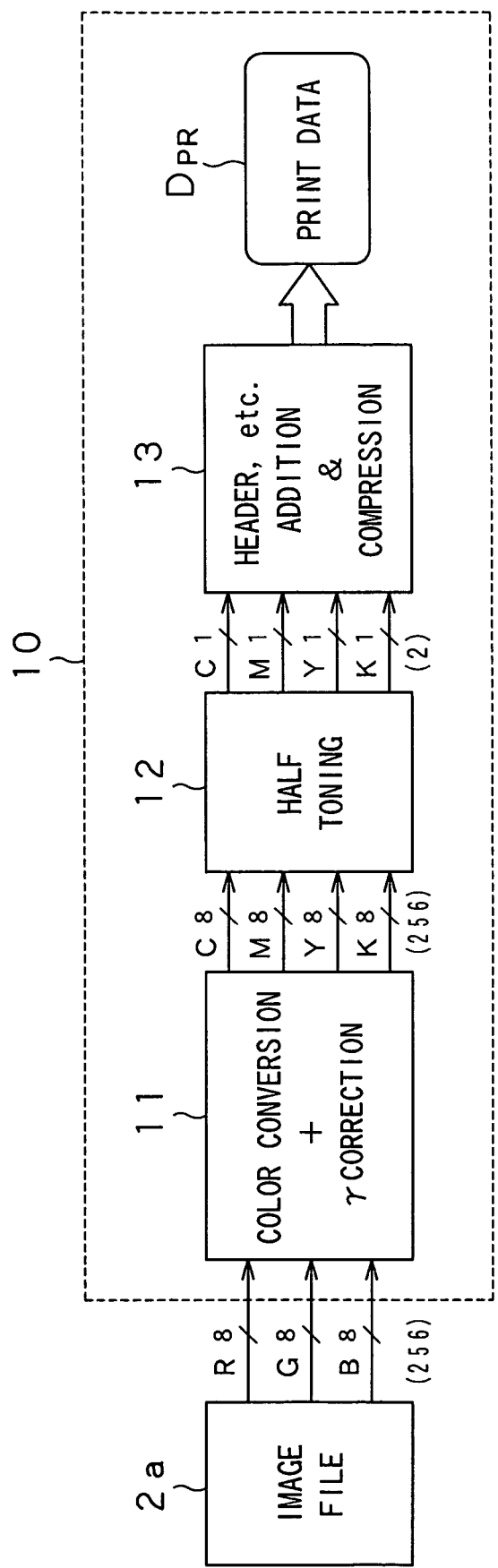
FIG. 2 is a block diagram of a computer device constituting the print system.

The functional block diagram of the computer device 10 is shown in FIG. 2. The computer device 10 comprises a color conversion+γ-correction unit 11 for implementing color conversion processing and γ-correction to RGB image data of image file 2a, a half-toning processing unit 12 for implementing half-toning processing to CMYK respective 8 bits delivered from the color conversion+γ-correction unit 11, and a header, etc. addition & compression unit 13 for adding header, etc. to the CMYK respective binary data from the half-toning processing unit 12 to compress the binary data thus obtained.

The color conversion+γ-correction unit 11 converts RGB image data of respective 8 bit 256 values of image file 2a into data of cyan (C) component, data of magenta (M) component and data of yellow (Y) component respectively consisting of 8 bits which are complementary colors of three primary colors (red, green, blue) by using, e.g., three-dimensional look-up table, etc. to further generate data of black (K) component of 8 bits from data of these components. In addition, the color conversion+γ-correction unit 11 implements signal processing such as color correction and/or γ-correction, etc. to data of cyan (C) component, data of magenta (M), data of yellow (Y) component.

The half-toning processing unit 12 converts the data of cyan (C) component, the data of magenta (M) component, the data of yellow (Y) component and the data of black (K) component into binary data of respective 1 bits by using the half-toning technology, e.g., error diffusion method or pattern Dither method, etc.

The header, etc. addition & compression unit 13 compresses CMYK respective binary data from the half-toning processing unit 12 in order to further improve transfer efficiency to add information necessary for performing the print thereto as header to generate print data $D_{PR}$.

Figure 3:
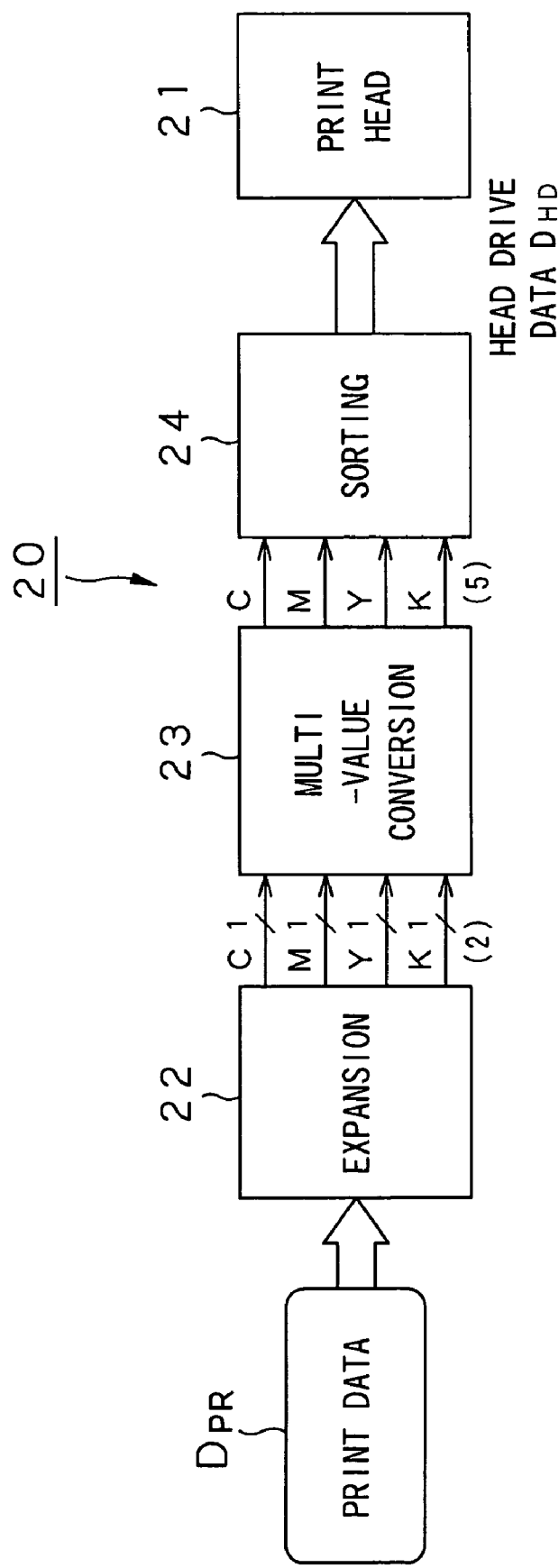
FIG. 3 is a functional block diagram of printer constituting the print system.

Then, the functional block diagram of the printer 20 is shown in FIG. 3. The printer 20 comprises an expansion unit 22 for expanding compressed image data included in the print data $D_{PR}$, a multi-value conversion unit 23 for allowing CMYK respective 1 bit binary data which are outputs from the expansion unit 22 to be multi-valued data, a sorting unit 24 for sorting CMYK respective multi-valued data from the multi-value conversion unit 23, and printer head 21 driven by head drive data $D_{HD}$ which is output from the sorting unit 24.

The expansion unit 22 receives print data $O_{PR}$ which has been caused to undergo data transfer from the computer device 10 to take out information necessary for performing print operation from the print data $D_{PR}$, and to expand the compressed image data to change it back into CMYK respective 1 bit binary data.

The multi-value conversion unit 23 converts CMYK respective 1 bit binary data from the expansion unit 22 into, e.g., quinary or sexenary data on the basis of multi-value conversion method which will be described later. In the multi-value conversion method, values that remarked pixel should take, which corresponds to circumstances of surrounding pixels, are set in table where two gradation data (0, 1) of the remarked pixel and values in which two gradation data of pixels around the remarked pixel, e.g., eight pixels positioned in the upper and lower directions, in the left and right directions and in oblique direction are assigned to respective digits of binary number of 8 figures are taken as parameter to make reference to this table to thereby convert two gradation data into quinary data. This multi-value conversion method will be described later in detail.

The sorting unit 24 sorts CMYK respective multi-valued data from the multi-value conversion unit 23 in drive order of the print head 21 to generate head drive data $D_{HD}$ to send it to the print head 21.

The print head 21 receives the head drive data $D_{HD}$ to print, onto a predetermined recording paper, image that user has designated at the computer device 10.

Then, the detail of the multi-value conversion method which constitutes basis of multi-value conversion processing that the multi-value conversion unit 23 performs will be explained. In image binarized by the error diffusion method, etc., since isolated dots are printed at the portion where density is low, and density of dot is increased according as density becomes high, it is possible to allow remarked pixel to have multi-value in accordance with dot density and bit arrangement around the remarked pixel.

Figure 4A:
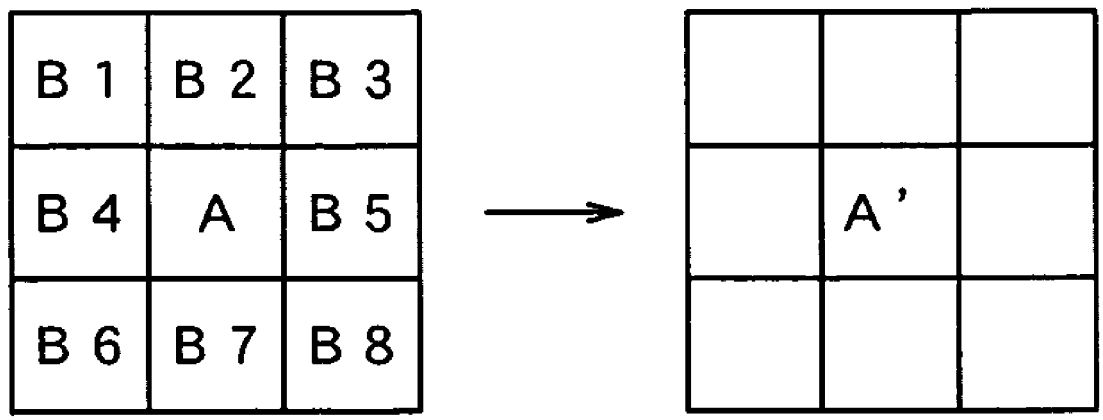
FIGS. 4A and 4B are views for explaining preparation of multi-valued data in conformity with multi-value conversion method which constitutes basis of multi-value conversion processing that multi-value conversion unit of the printer performs.
Figure 4B:
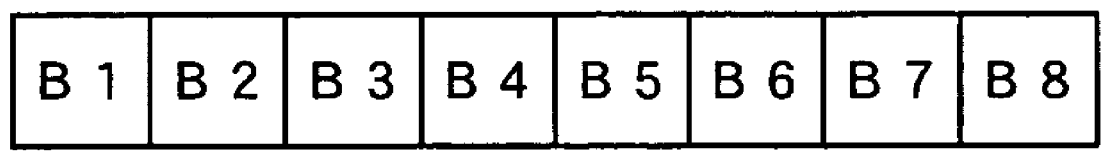

Let assume that value of binary remarked pixel is A and values of eight pixels therearound (positioned in upper and lower directions, in left and right directions and in oblique direction) are B1, B2, B3, B4, B5, B6, B7, B8 as shown in FIG. 4A. Here, B is binary number and Bs are arranged as shown in FIG. 4B. Further, T[A][B] is caused to be remarked pixel after multi-value processing, and values suitable for combination of respective AB with respect to value B of 8 pixels around the binary (binarized) remark pixel A is set at table to thereby determine multi-valued remarked pixel A' as follows.

A'=T [A][B]

As stated above, since the multi-value conversion unit 23 performs multi-value conversion processing using table in this way, it is possible to convert binary remarked pixel into multi-value without complicated conditional branch.

Here, binary (two gradations) data of the remarked pixel and the surrounding pixels are compared with each other to represent high density/low density. Hereinafter, for brevity of explanation, high density is changed into black as expression and low density is changed into white as expression as occasion demands. It is to be noted that, in the case of C, M, Y, there result C of high density, M of high density and Y of high density.

In FIGS. 5 to 28, there are shown first practical examples of tables where binarized A, value B of eight pixels therearound, binary number of B (corresponding to FIG. 4B), and value of multi-valued remarked pixel T [A][B] which has been set are stored. It is to be noted that this table is merely one example, and it is therefore desirable to individually prepare optimum tables by binarization processing method and/or specification of the printer (size of dot, density of dot, resolution, etc.). In this example, value of the multi-valued remarked pixel T [A][B] is set to quinary data from 0 to 4. This is because the value of the multi-valued remarked pixel is caused to be in correspondence with gradation representation ability, i.e., quinary data here of the printer 20.

FIGS. 5 to 16 show values of multi-valued remarked pixel T [A][B] when values of surrounding eight pixels B are 0 to 255 (00000000 to 11111111) with respect to the fact that value of binarized remarked pixel A is 0. When the value of the binarized remarked pixel A is 0, value of multi-valued remarked pixel T [A][B] is caused to be equal to zero in most cases. However, in this example, at "90, 91, 94, 95, 122, 123, 126, 127, 218, 219, 222, 223, 250, 251, 254, 255" where at least upper and lower, and left and right four values (B2, B4, B5, B7) of the value B of the surrounding eight pixels are 1, value of the A is set to 1.

FIGS. 17 to 28 show value of multi-valued remarked pixel T [A][B] when values of the surrounding eight pixels B are 0 to 255 (00000000 to 11111111) with respect to the fact that value of binarized remarked pixel A is 1. In this case, there exits feature as recited below. First, when A=1 and B=0, i.e., when value of remarked pixel A is black (1) size of two gradations and all of surrounding pixels are white (00000000) side, the value of remarked pixel T [A][B] is caused to be value (1) in the vicinity of the minimum value of multi-gradation. In addition, that value may be set to minimum value (0).

When A=1 and B=255, i.e., when value of the remarked pixel is black (1) side of two gradations and all of surrounding pixels are black (11111111) side, value of the remarked pixel T [A][B] is set to the maximum value (4) of multi-gradation. In addition, that value may be set to value (3) in the vicinity of the maximum value.

At 90, 91, 94, 95, 122, 123, 126, 127, 218, 219, 222, 223, 250, 251, 254, 255" where A=1 and at least upper and lower, and left and right four values (B2, B4, B5, B7) of value B of surrounding eight pixels are 1, value of the remarked pixel T [A][B] is set to value (3) in the vicinity of the maximum value of multi-gradation. In addition, that value may be set to the maximum value (4).

A practical example of multi-value conversion processing that the multi-value conversion unit 23 performs when value of the binary remarked pixel A is equal to zero and that value is equal to 1 is shown below.

First, the practical example when A is equal to zero will be explained by using FIGS. 29, 30, 31 and 32.

This processing is a processing such that, e.g., binary data of C (cyan) is delivered from the expansion unit 22 to the multi-value conversion unit 23 in FIG. 3 to make reference to the table at the multi-value conversion unit 23 to convert binary data of C (cyan) into quinary data.

Figure 29:
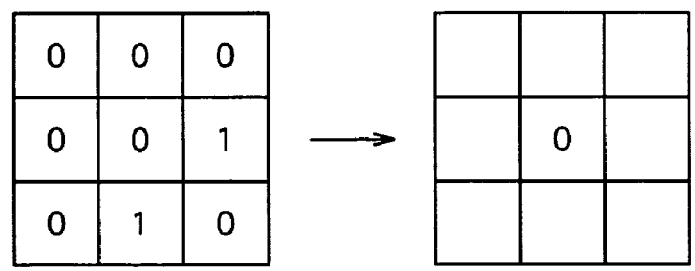
FIGS. 29 to 37 are views for explaining practical example of multi-value conversion processing that the multi-value processing unit of the printer performs with reference to the first practical example of the table.

When A is 0 and B is 10 (binary number: 00001010) as shown in FIG. 29, the multi-value conversion unit 23 takes out T [1][10] from the table shown in FIG. 5 to allow remarked pixel A' to be equal to 0.

Figure 30:
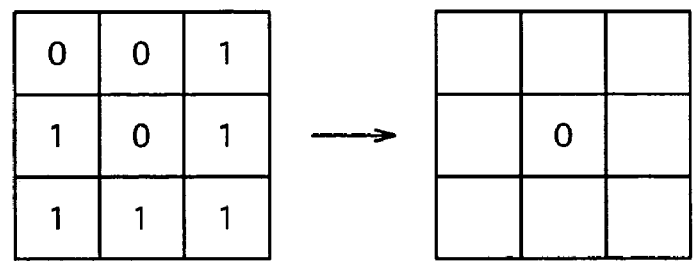

When A is 0 and B is 63 (binary number: 0011111) as shown in FIG. 30, the multi-value conversion unit 23 takes out T [0][63] from the table shown in FIG. 7 to allow remarked pixel A' to be equal to 0.

Figure 31:
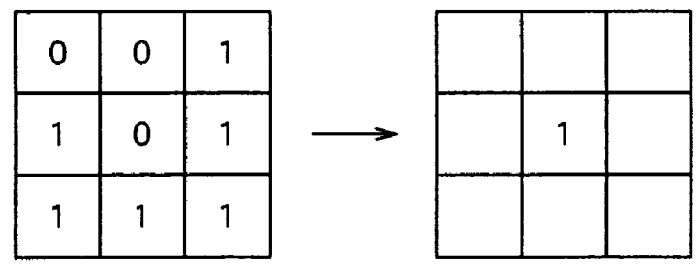

When A is 0 and B is 95 (binary number: 01011111) as shown in FIG. 31, the multi-value conversion unit 23 takes out T [0][95] from the table shown in FIG. 9 to allow remarked pixel A' to be equal to 1.

Figure 32:
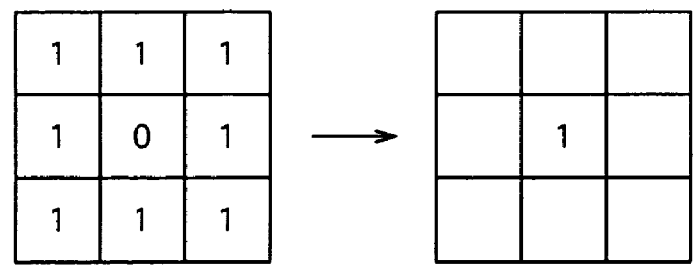

When A is 0 and B is 255 (binary number: 11111111) as shown in FIG. 32, the multi-value conversion unit 23 takes out T [0][255] from the table shown in FIG. 15 to allow remarked pixel A' to be equal to 1. This is because the case where thin pixel (1) exists at the solid portion is more natural than the case where 0 exists thereat in dependency upon image.

Then, practical example when A=1 will be explained by using FIGS. 33, 34 and 35.

This processing is also a processing such that, e.g., binary data of C (cyan) is delivered from the expansion unit 22 to the multi-value conversion unit 23 in FIG. 3 to make reference to the table at the multi-value conversion unit 23 to convert binary data of C (cyan) into quinary data.

Figure 33:
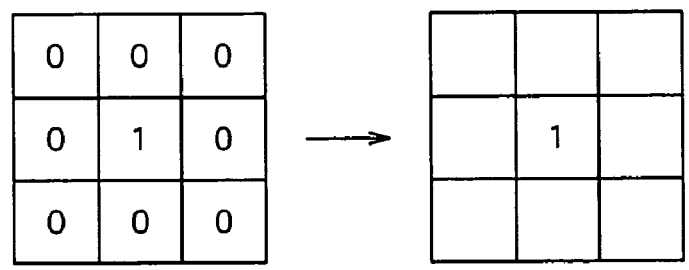

When A is 1 and B is 0 (binary number: 00000000) as shown in FIG. 33, the multi-value conversion unit 23 takes out T [A][B] from the table shown in FIG. 17 to allow remarked pixel A' to be equal to 1.

Figure 34:
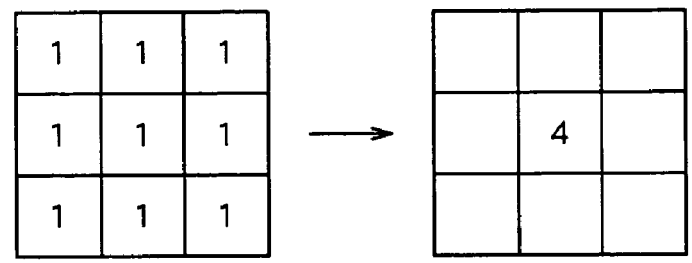

When A is 1 and B is 255 (binary number: 11111111) as shown in FIG. 34, the multi-value conversion unit 23 takes out T[A][B] from the table shown in FIG. 28 to allow remarked pixel A' to be equal to 4.

Figure 35:
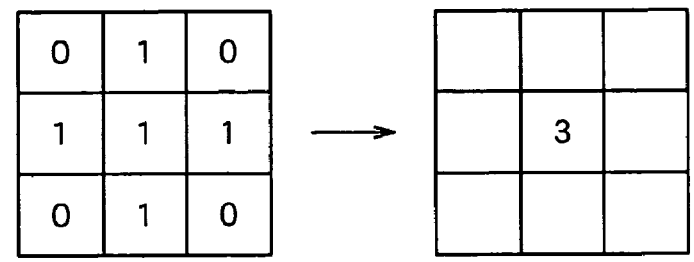

When A is 1 and B is 90 (binary number: 01011010) as shown in FIG. 35, the multi-value conversion unit 23 takes out T[A][B] from the table shown in FIG. 21 to allow remarked pixel A' to be equal to 3.

Methods of determining value of T[A][B] in setting of table are variously conceivable. In this case, if there is employed such an approach that when there are many values of 1 as values of surrounding pixels (positioned in upper and lower directions, in left and right directions and in oblique direction), large number is set, and when there are less values of 1 as such value, small value is set, the portion where density is low is permitted to be thinner and the portion where the density is high is permitted to be thicker. Thus, it is possible to increase gradation as compared to the case of binary data.

Figure 36:
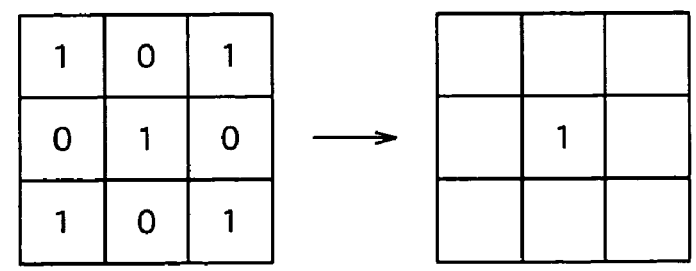

Moreover, when the distance between dots is apart from each other, even in the case of a pattern such that values of surrounding eight pixels are similar to each other, there are instances where it is preferable to take number smaller than that of the distance between dots is narrow. This is the case as shown in FIG. 36. When A is 1 and B is 165 (10100101), the portion positioned obliquely with respect to A among values of surrounding eight pixels is 1. This is similar to the case of T[1][90] shown in FIG. 35 as pattern. In the case of T[1][90], values of 1 exist at upper and lower positions and at left and right positions, and that value is therefore set to 3. However, at the time of T[1][165] shown in FIG. 36, since values of 1 exist at oblique positions. Accordingly, the distance between dots is apart from each other. Thus, when there is employed a method in which that value is rather set to the same value as T[1][0] shown in FIG. 33, or value in the vicinity thereof, gradation change becomes natural.

The multi-value conversion method performed at the multi-value conversion unit 23 is also characterized in that in the case where value of remarked pixel is black (1) side of two gradations and is positioned at the boundary between black area and white area, value of remarked pixel is set to the minimum value (0) of multi-gradation or the minimum neighboring value (1 or 2 here). For example, T[1][214] when A=1 and B=214, i.e., value of remarked pixel is black (1) side of two gradations and surrounding eight pixels are (11010110) are set to 2 as shown in FIG. 27.

Figures 37, 38:
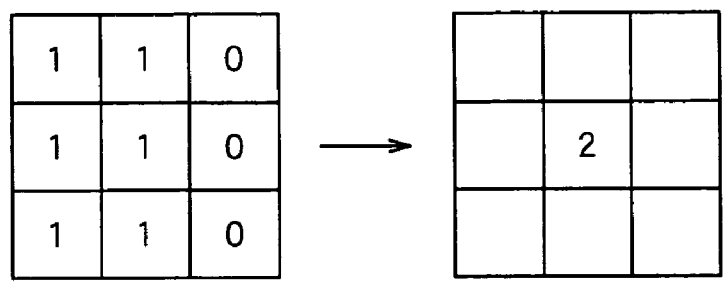
FIG. 38 is a view showing a second practical example of table in which data prepared as the result of preparation of multi-valued data are stored.

When the remarked pixel is 1 and the surrounding eight pixels are (11010110) as shown in FIG. 37, since the surrounding successive three pixels are 0 and the remaining pixels are 1, it is judged that corresponding pixels are pixels on the boundary to set that value to 2, etc. Thus, it is possible to set density at the boundary portion of image to value different from other portion. As a result, it is possible to provide the effects/advantages of blurring prevention at the boundary between solid portions of different colors and/or blurring prevention of edge of character.

While table example where value of multi-valued T[A][B] is set to quinary data (value) from 0 to 4 is shown in FIGS. 5 to 28, table example in the case where that value is set to sexenary data (value) from 0 to 5 can be also prepared as shown in FIG. 38 on the basis of the previously described multi-value conversion method. Here, when, e.g., A=1 and B=1, i.e., when value of the remarked pixel A is black (1) side of two gradations and the surrounding pixels are (00000001), value of T[A][B] is set to (2) of multi-gradation. In addition, when A=1 and B=255, value of T[A][B] is set to the maximum value (5) of multi-gradation.

The practical example for converting binary data into sexenary data will be described below by using FIGS. 39 to 44. This processing is a processing such that, e.g., binary data of C (cyan) is delivered from the expansion unit 22 to the multi-value conversion unit 23 in FIG. 3 to convert binary data of C (cyan) into sexenary data with reference to the table shown in FIG. 38 at the multi-value conversion unit 23.

Figure 39:
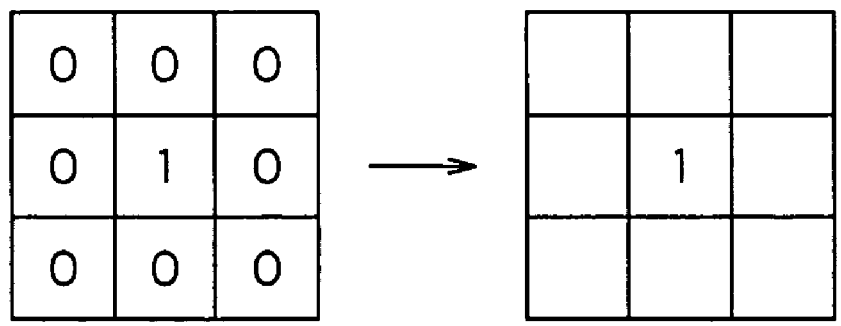
FIGS. 39 to 44 are views for explaining practical example of multi-value conversion processing that the multi-value conversion unit of the printer performs with reference to the second practical example of the table.

When A is 1 and B is 0 (binary number: 00000000) as shown in FIG. 39, the multi-value conversion unit 23 takes out T[A][B] from the table shown in FIG. 38 to allow remarked pixel A' to be equal to 1.

Figure 40:
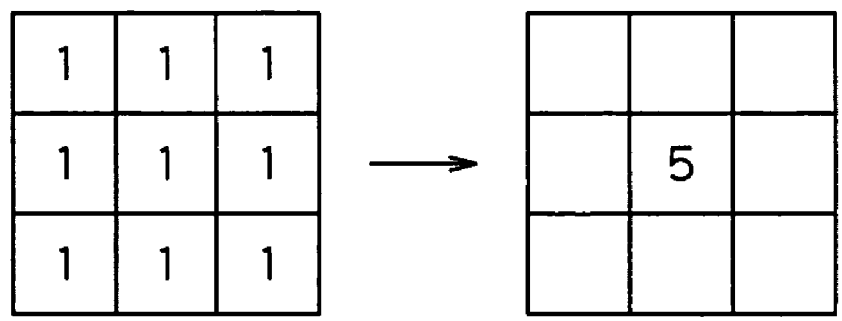

When A is 1 and B is 255 (binary number: 11111111) as shown in FIG. 40, the multi-value conversion unit 23 takes out T[A][B] from the table shown in FIG. 38 to allow remarked pixel A' to be equal to 5.

Figure 41:
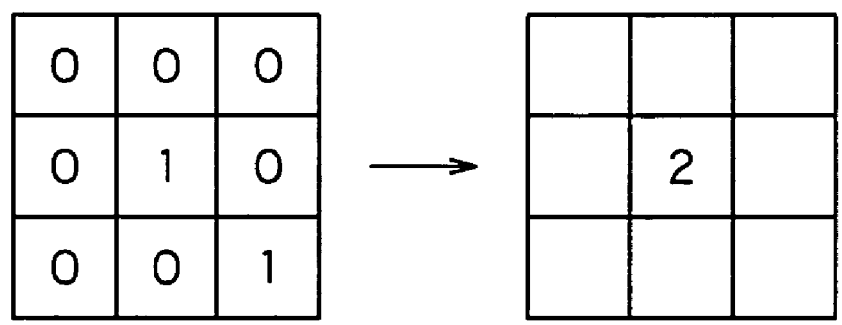

When A is 1 and B is 1 (binary number: 00000001) as shown in FIG. 41, the multi-value conversion unit 23 takes out T[A][B] from the table shown in FIG. 38 to allow remarked pixel A' to be equal to 2.

Figure 42:
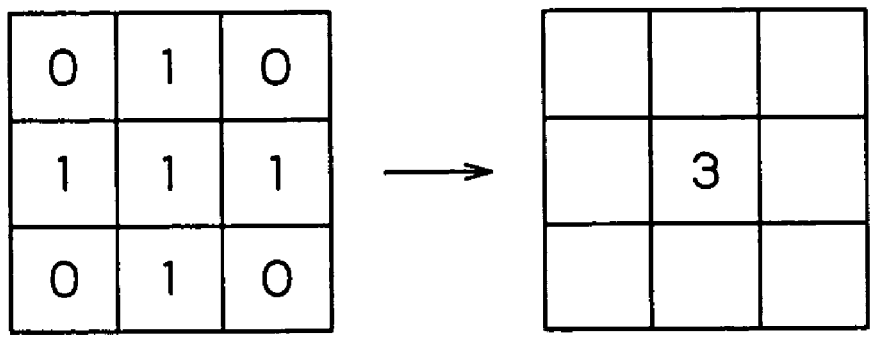

When A is 1 and B is 90 (binary number: 01011010) as shown in FIG. 42, the multi-value conversion unit 23 takes out T[A][B] from the table shown in FIG. 38 to allow remarked pixel A' to be equal to 3.

Figure 43:
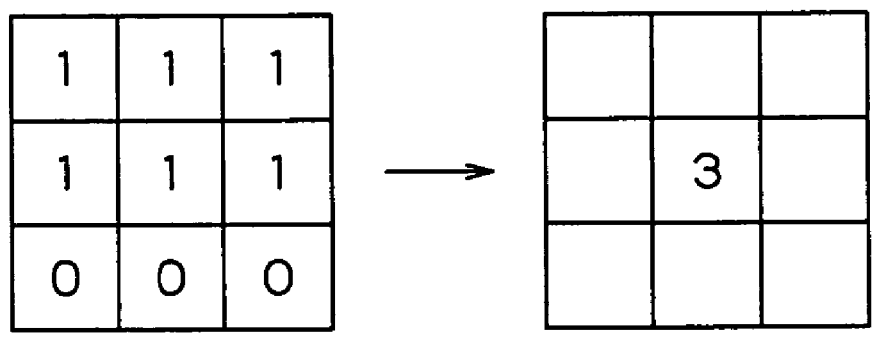

When A is 1 and B is 248 (binary number: 11111000) as shown in FIG. 43, the multi-value conversion unit 23 takes out T[A][B] from the table shown in FIG. 38 to allow remarked pixel A' to be equal to 3.

Figure 44:
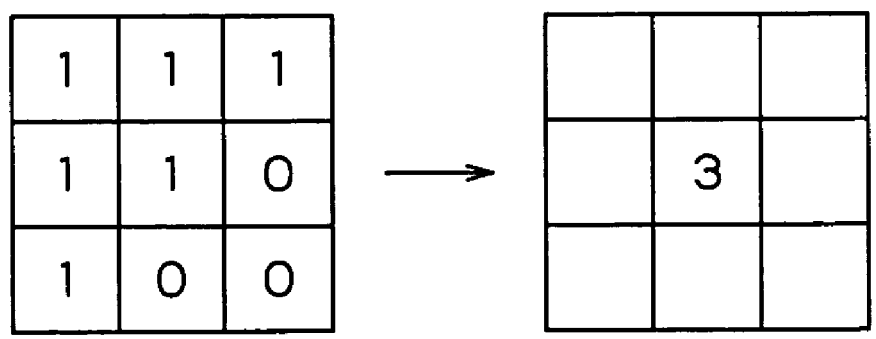

When A is 1 and B is 244 (binary number: 11110100) as shown in FIG. 44, the multi-value conversion unit 23 takes out T[A][B] from the table shown in FIG. 38 to allow remarked pixel A' to be equal to 3.

The reason why the picture quality of binary data is poor is that dots of high density are thinly printed particularly at the highlight portion. In view of the above, if printer 20 which permits, e.g., print of quinary or sexenary data is used to set conversion table as shown in FIGS. 5 to 28 or FIG. 38, e.g., in the case of isolated dot, conversion into 1 is made. As a result, since dots of low density are printed, granular feeling is lowered so that picture quality can be improved. Moreover, since in the case where dots exist at all surrounding portions, conversion into 4 or 5 of high density can be made, and in the case where dots thinly exist at the surrounding portion, conversion into 2 or 3 can be made, print in conformity with gradation can be made. Further, in the case where value of remarked pixel is black (1) side of two gradations, and exists at the boundary between black area and white area, value of the remarked pixel is set to the minimum value (0) or value in the vicinity of the minimum value (1, 2 or 3) of multi-gradation, thereby also making it possible to lower level of the edge portion. This is effective particularly for ink jet printer, and permits elimination of blurring of the edge portion of character, etc., or reduction in color bleed taking place at the boundary portion between solid portions of different colors.

The processing performed in the print system 1 which has been explained above are collectively shown in FIG. 45. This includes practical example of print method of the present invention.

First, processing performed at the computer device 10 are shown at steps S1 to S3. The computer device 10 converts, at step S1, RGB image data of respective 8 bit 256 values of image file 2a into data of cyan (C) component, data of magenta (M) component and data of yellow (Y) component, e.g., respectively consisting of 8 bits which complementary colors of three primary colors (red, green, blue) by using, e.g., three-dimensional look-up table, etc. to further generate data of black (K) component of 8 bits from data of these components. In addition, signal processing such as color correction or γ-correction, etc. is implemented to data of cyan (C) component, data of magenta (M) component and data of yellow (Y) component.

Then, the computer device 10 converts, at step S2, data of the cyan (C) component, data of magenta (M) component, data of yellow (Y) component, data of black (K) component into binary data of respective 1 bits by using the half-toning technology, e.g., error diffusion method or pattern Dither method, etc.

At step S3, CMYK respective binary data to which half-toning processing has been implemented are compressed in order to further improve transfer efficiency to add information necessary for performing the print as header to generate print data $D_{PR}$.

The step S4 is processing for data transfer.

Figure 46:
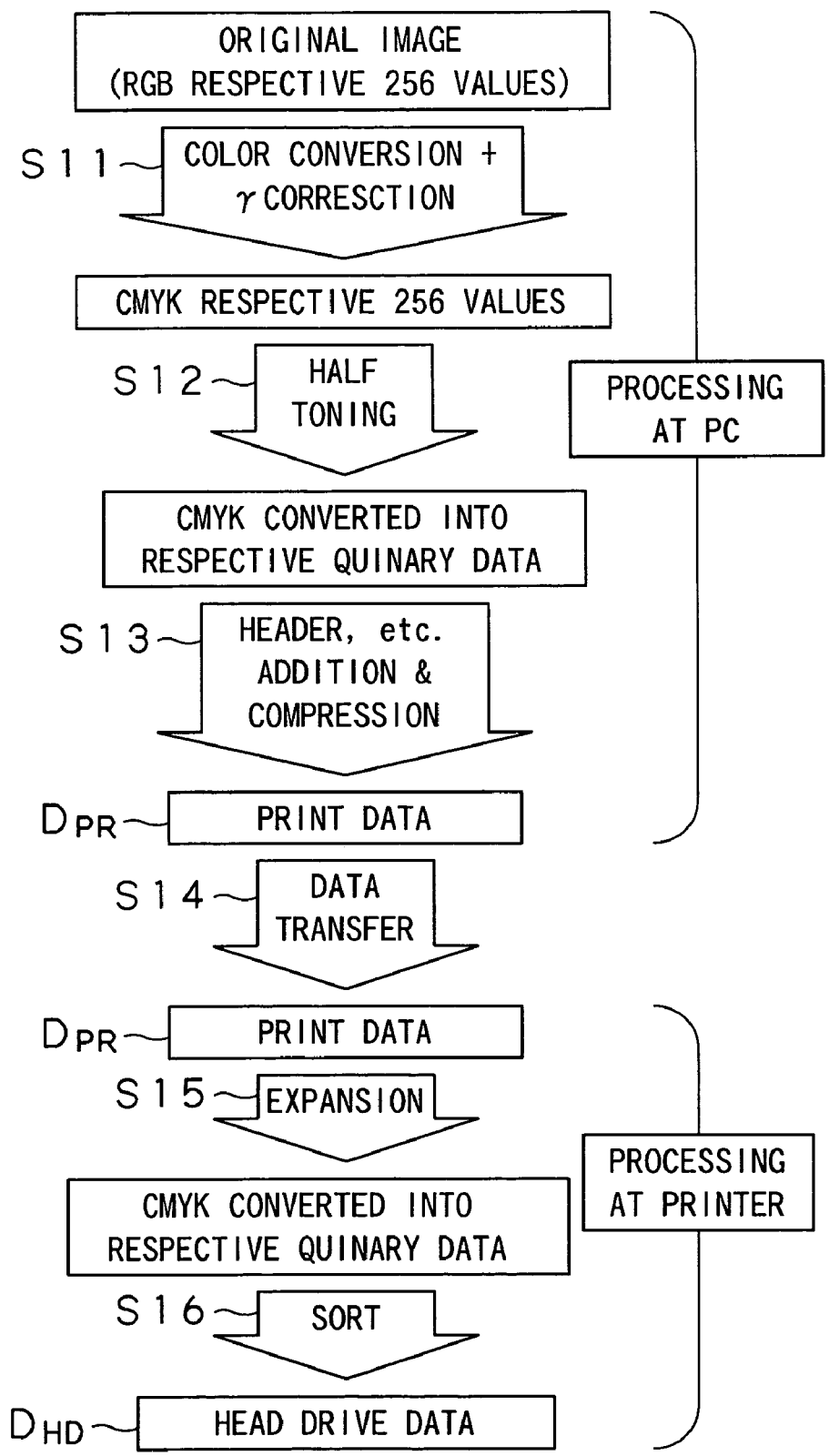
FIG. 46 is a view in which processing performed in the conventional print system are collected.

Meanwhile, in the conventional processing, as shown in FIG. 46, conversion into data of CMYK respective quinary data is performed at half-toning processing of step S12 after color conversion+γ-correction processing of step S11 to compress the data thus obtained at step S13 to allow it to be print data $D_{PR}$. Accordingly, it took much time in data transfer processing of step S14.

On the contrary, in the data transfer of step S4, since image data is converted into binary data at the step S2, data quantity can be reduced to much degree. Thus, data transfer time can be shortened.

Figure 45:
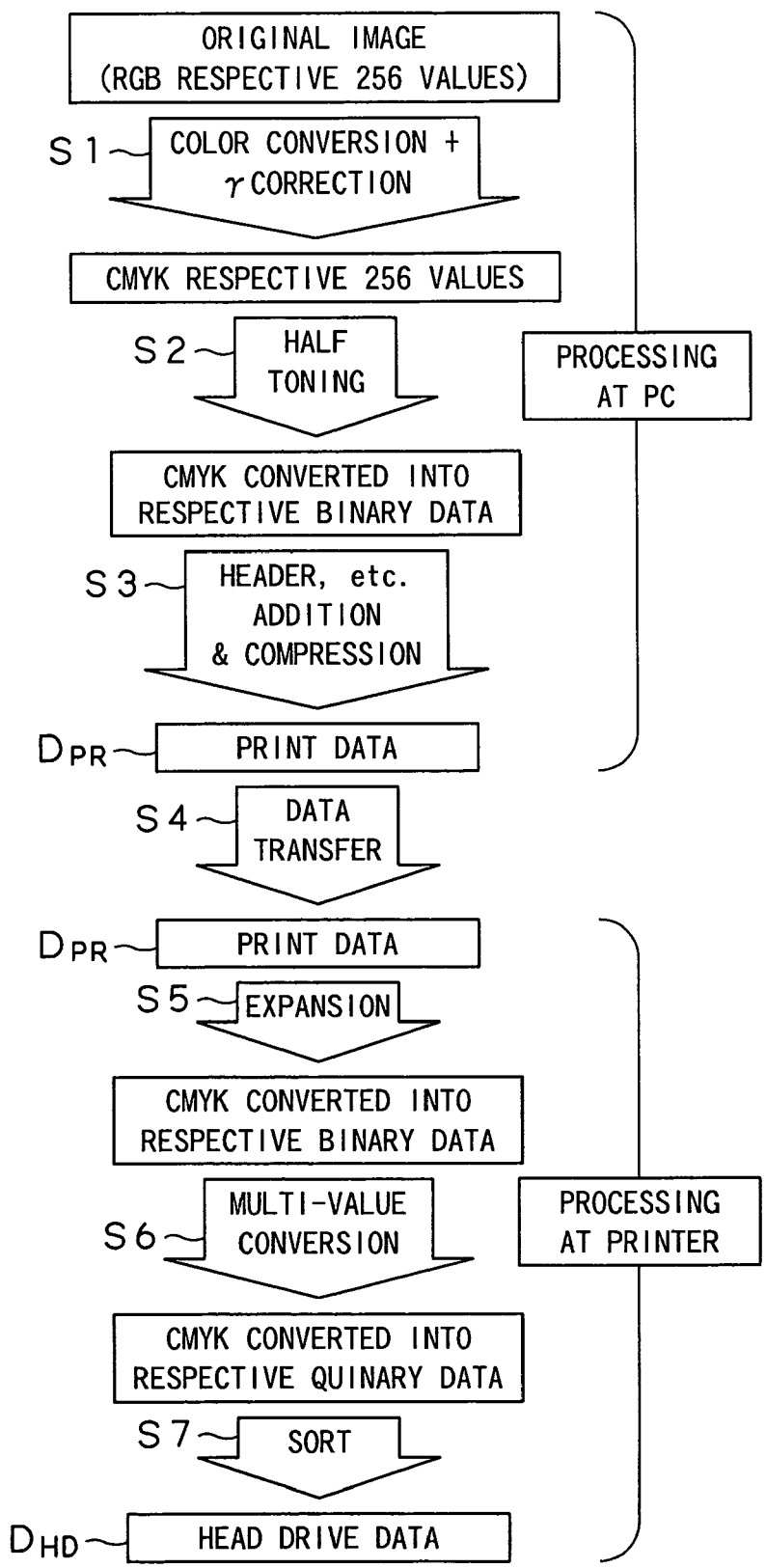
FIG. 45 is a view in which processing performed in the print system are collected.

At the printer 20 side, when print operation is performed under the state of binary data, only printed result of low picture quality can be obtained. In view of the above, in the print system 1, at the printer 20, binary data is converted into multi-valued, e.g., quinary or sexenary data in a manner previously described. The processing in FIG. 45 is processing of step S6.

First, at step S5, the printer 20 receives print data $D_{PR}$ which has been caused to undergo data transfer (step S4) to take out information necessary for performing print operation from the print data $D_{PR}$, and to expand compressed image data to change it back into CMYK respective 1 bit binary data.

Then, at the step S6, the expanded CMYK respective 1 bit binary data are converted into, e.g., quinary or sexenary data on the basis of the previously described multi-value conversion method.

The CMYK respective multi-valued data which are multi-valued are sorted at step S7 in drive order of the printer head 21 to generate head drive data $D_{HD}$.

In the conventional processing example shown in FIG. 46, since data transfer at step S14 is performed by quinary data, CMYK respective quinary data are obtained after expansion is performed at step S15. As a result, multi-value conversion processing like the step S6 of FIG. 45 becomes unnecessary. Thus, it is possible to shift to sort processing of step S16. The time required for step S6 which is data processing at the printer side is extremely smaller than data transfer time. The printer system 1 of this embodiment can shorten total printing time to more degree.

Further, in the print system 1, since binary data is converted into multi-valued data, it is possible to obtain printed matter of high picture quality as compared to simple binary data. That picture quality is not particularly so inferior as compared to printed matter of the print system of the conventional example which performs processing shown in FIG. 46.

The effects or advantages of the print system 1 of this embodiment which has been explained are summarized below.

First, in accordance with the print system 1, since data sent from the computer device 10 to the printer 20 is binary data, there are many merits that data quantity is reduced so that data transfer time becomes short, and traffic on the network can be lessened, etc. In addition, since printed result is obtained as multi-valued data, printed result of which picture quality is higher than that of binary image can be obtained.

At the printer 20, since gradation can be changed in dependency upon how dots around the remarked pixel are printed, it is possible to freely make setting such that in the case where the number of dots is low at the periphery, the density is lowered, or density is caused to be high at portions where peripheral dots are many, and/or the density of the edge portion of image is caused to be high or low.

At the printer 20, conversion processing from binary data to multi-valued data is caused to be table in advance to thereby eliminate the necessity of performing classification of various cases. Thus, processing can be performed at a high speed, and processing can be performed without conducting conditional branch in performing parallel processing by DSP, etc.

At the computer device 10, since matrix Dither or error diffusion is used in binarizing original data, dots are thinly printed at highlight portion. In such case, since density of isolated dots can be set to low value at the printer 20 side, it is possible to obtain printed matter having less granular feeling.

At the computer device 10, when matrix Dither or error diffusion is used in binarizing original data, dots are thickly printed at high density portion. In such a case, since density of successive dots is permitted to be high at the printer 20 side, density of the portion for which high density is required is caused to be high, At the printer 20, it is possible to change level of edge portion of image. Particularly, in the case of ink jet printer, since ink quantity of the edge portion can be reduced by changing the level, it becomes possible to reduce blurring between colors and blurring onto paper.

At the printer 20, since level can be changed in accordance with the number of dots printed onto pixels around the remarked pixel, conversion into low level can be made at low gradation where dots are thinly printed, and conversion into high level can be made at high gradation where dots are printed large number of times at the peripheral portions.

A practical example of the printer 20 will be explained below.

First, there is mentioned ink jet printer using line head in which a large number of nozzles are arranged in a direction perpendicular to paper feed direction when recording paper of A4 size is printed in the longitudinal direction as print head.

Figure 47:
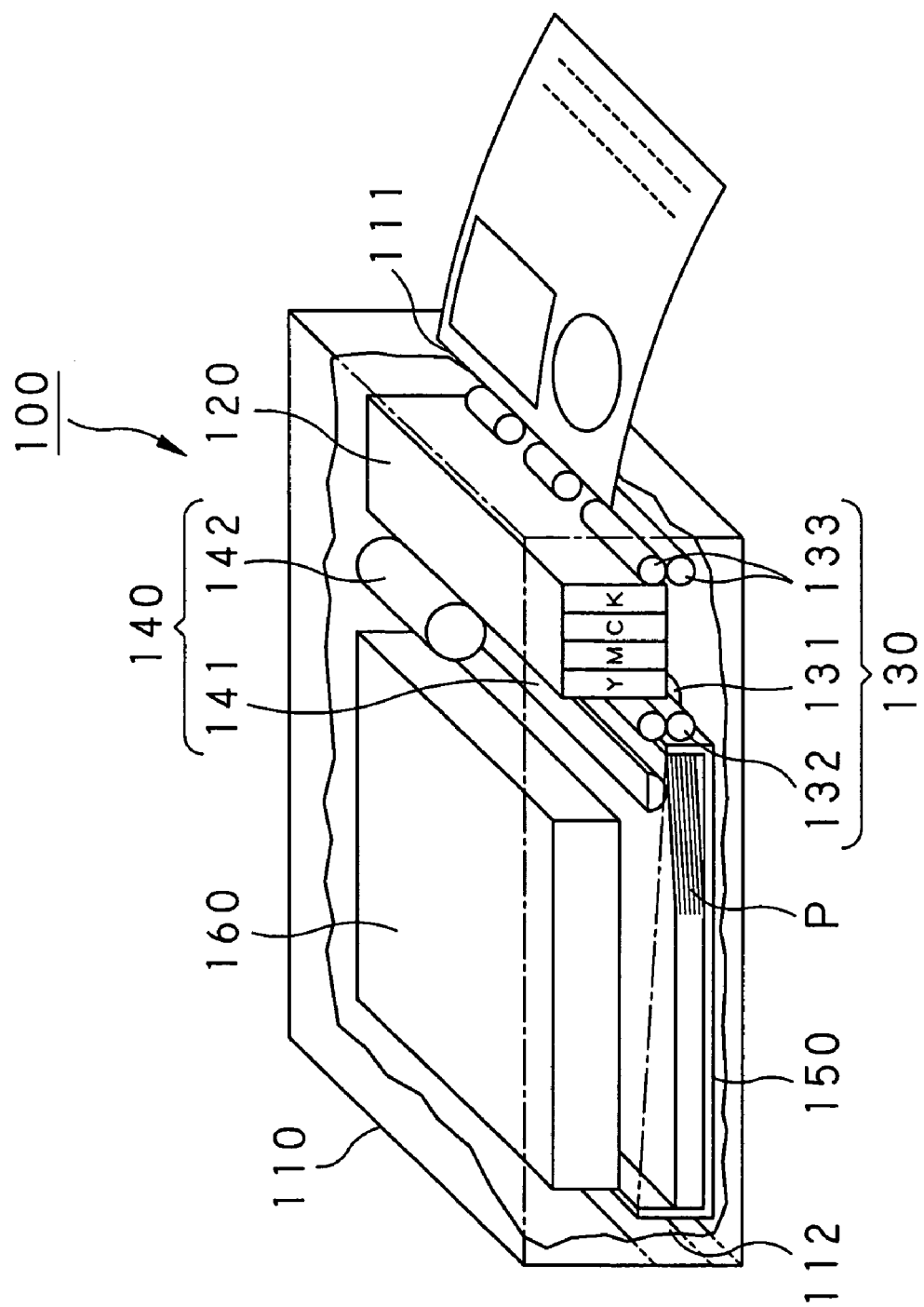
FIG. 47 is a cross sectional perspective view of practical example of ink jet printer using line head.
Figure 48:
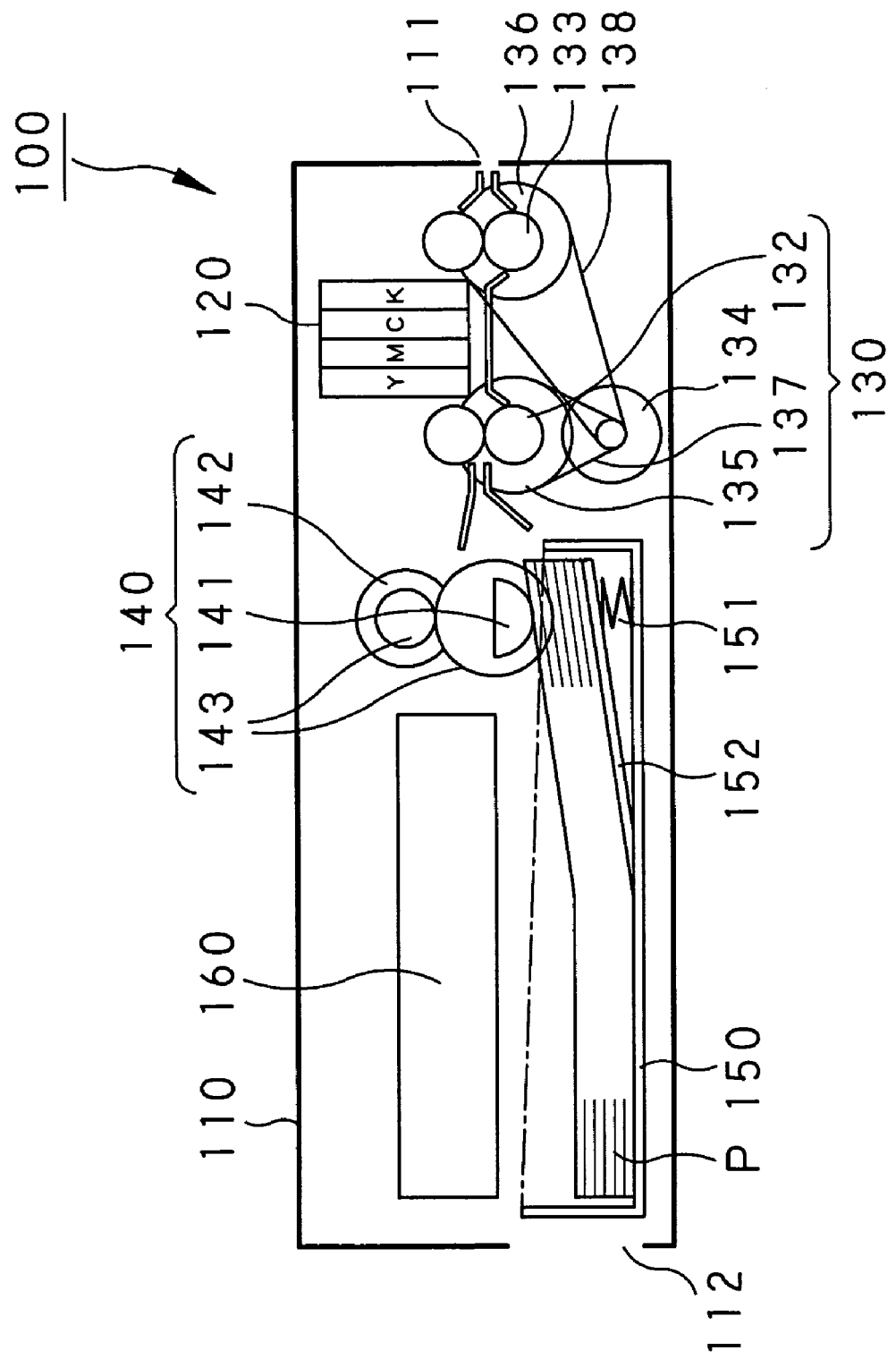
FIG. 48 is a cross sectional side view of practical example of ink jet printer.

As shown in FIGS. 47 and 48, this ink jet printer 100 comprises a line head 120 including heat element which will be described later as a drive element which discharges droplets of ink, and having recording range of substantially width size of paper P and having modulation function of the so-called PNM (Pulse Number Modulation) system which performs modulation of diameter and density of dot by the number of droplets of ink. It is to be noted that the number of droplets printed with respect to 1 dot is set to eight (8) at the maximum per one color for explanation in this case.

The ink jet printer 100 is caused to be of the configuration in which line head 120, a paper feed unit 130, a paper delivery unit 140, a paper tray 150 and an electric circuit unit 160, etc. are disposed within a casing 100.

The casing 100 is formed so as to take parallelepiped shape, wherein a paper eject hole 111 for paper P is provided at one end terminal side surface and a tray exit/entrance 112 for the paper tray 150 is provided at the other end side. The line head 120 comprises head portions corresponding to four colors of CMYK (cyan, magenta, yellow, black), wherein an ink discharge portion which discharges ink droplets is disposed at the end side upper portion of the paper eject hole 111 side in such a manner directed downwardly.

Namely, as described later, this line head 120 is caused to be of the configuration in which four (in this case) ink discharge means in long form which are formed every respective colors as described later are arranged in feed direction of paper.

The paper feed unit 130 comprises a paper feed guide 131, paper feed rollers 132, 133, a paper feed motor 134, pulleys 135, 136, and belts 137, 138, and is disposed at the end portion lower direction of the paper eject hole 111 side. The paper feed guide 131 is formed so as to take flat plate shape, and is disposed at the lower direction of the line head 120 with a predetermined spacing. The respective paper feed rollers 132, 133 are comprised of a pair of rollers which are in contact with each other, and are disposed at both sides of the paper feed guide 131, i.e., the tray exit/entrance 112 side and the paper eject hole 111 side. The paper feed motor 134 is disposed at the lower portion of the paper feed guide 131, and is connected to the respective paper feed rollers 132, 133 through pulleys 135, 136 and belts 137, 138.

The paper delivery unit 140 comprises a paper delivery roller 141, a paper delivery motor 142 and gears 143, and is disposed at the tray exit/entrance 112 side with respect to the paper feed unit 130. The paper delivery roller 141 is formed so as to take substantially semi-cylindrical shape, and is disposed in the state close to the paper feed roller 132 of the tray exit/entrance 112 side. The paper delivery motor 142 is disposed above the paper delivery roller 141, and is connected to the paper delivery roller 141 through the gears 143.

The paper tray 150 is formed so as to take box shape such that papers P of, e.g., A4 size can be accommodated in the state where plural papers are stacked, wherein a paper support 152 held by a spring 151 is provided at one end surface of the bottom surface, and is disposed in a manner extending from the lower portion of the paper delivery unit 140 toward the tray exit/entrance 112. The electric circuit unit 160 is a portion for controlling drives of respective components, and is disposed above the paper tray 150.

In such configuration, its operation example will be explained.

User draws the paper tray 150 from the tray exit/entrance 112 to accommodate a predetermined number of papers P within the paper tray 150 to push (thrust) it thereinto. Thus, the paper support 152 raises one end portion of paper P by action of the spring 151 to push (thrust) it toward the paper delivery roller 141. When print start signal is given, the paper delivery roller 141 is rotated by drive of the paper delivery motor 142 to send out one paper P from the paper tray 150 to the paper feed roller 132. Subsequently, respective paper feed rollers 132, 133 are rotated by drive of the paper feed motor 134. As a result, the paper feed roller 132 sends out the paper P which has been sent out to the paper feed guide 131. Thus, the line head 120 becomes operative at a predetermined timing in accordance with data to be printed to discharge droplets of ink from the ink discharge portion to get down them onto the paper P to record characters or images consisting of dots, etc. Further, the paper feed roller 133 ejects, from the paper eject hole 111, the paper which has been sent out.

Then, the internal configuration of the electric circuit unit 160 and the block configuration of the peripheral portion thereof will be explained by using FIG. 49.

The electric circuit unit 160 comprises a printer side data processing section 161, a head controller 162, a head position and paper feed controller 163, and a system controller 164.

The printer side data processing section 161 executes the steps S5 to S7 of FIG. 4 in order to realize the expansion unit 22, the multi-value conversion unit 22 and the sorting unit 24 which are respective functional blocks shown in the previously described FIG. 3. Namely, the printer side data processing section 161 receives print data $D_{PR}$ which has been caused to undergo data transfer to take out, from this print data $D_{PR}$, information necessary for performing print operation, and to expand compressed image data to change it into CMYK respective 1 bit binary data. Then, the expanded CMYK respective 1 bit binary data are converted into, e.g., quinary or sexenary data on the basis of the previously described multi-value conversion method. The CMYK respective multi-valued data which have been multi-valued at step S7 are sorted in drive order of the line head 120 to generate head drive data $D_{HD}$.

The head controller 162 controls ink droplet discharge operation of the line head 120. The head position and paper feed controller 163 controls position of the line head 120 and paper feed of the recording paper P.

The system controller 164 controls the printer side data processing section 161, the head controller 162, and the head position and paper feed controller 163.

Then, the detail of the line head 120 will be explained by using FIGS. 50 to 54.

Figure 54:
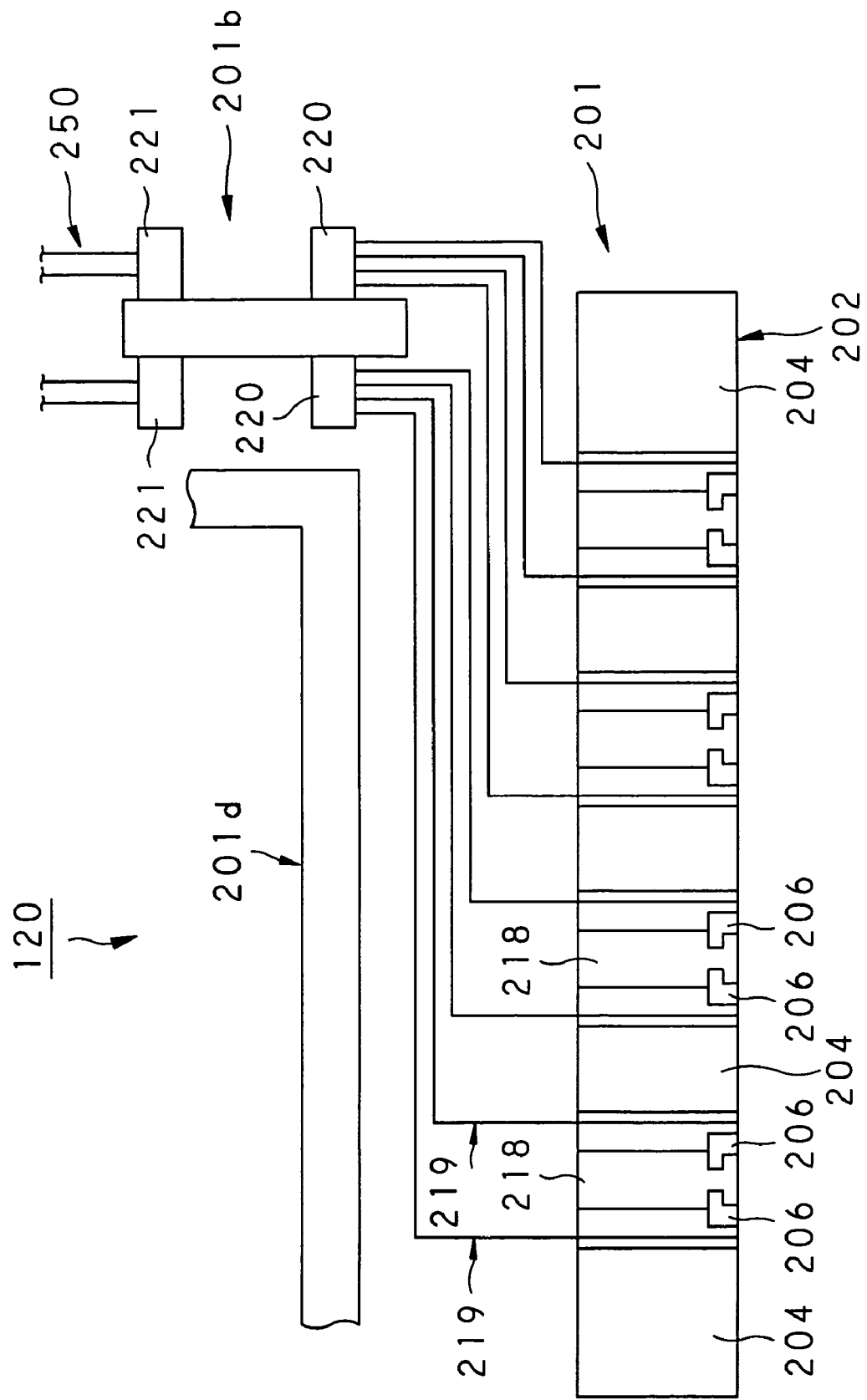
FIG. 54 is a schematic cross sectional view showing line head.

The line head 120 comprises a head chip module 201a and a relay board 201b of which structures are shown in FIG. 54. First, the head chip module 201a will be explained below. In this case, FIG. 50 is an exploded perspective view of the head chip module 201a.

Figure 50:
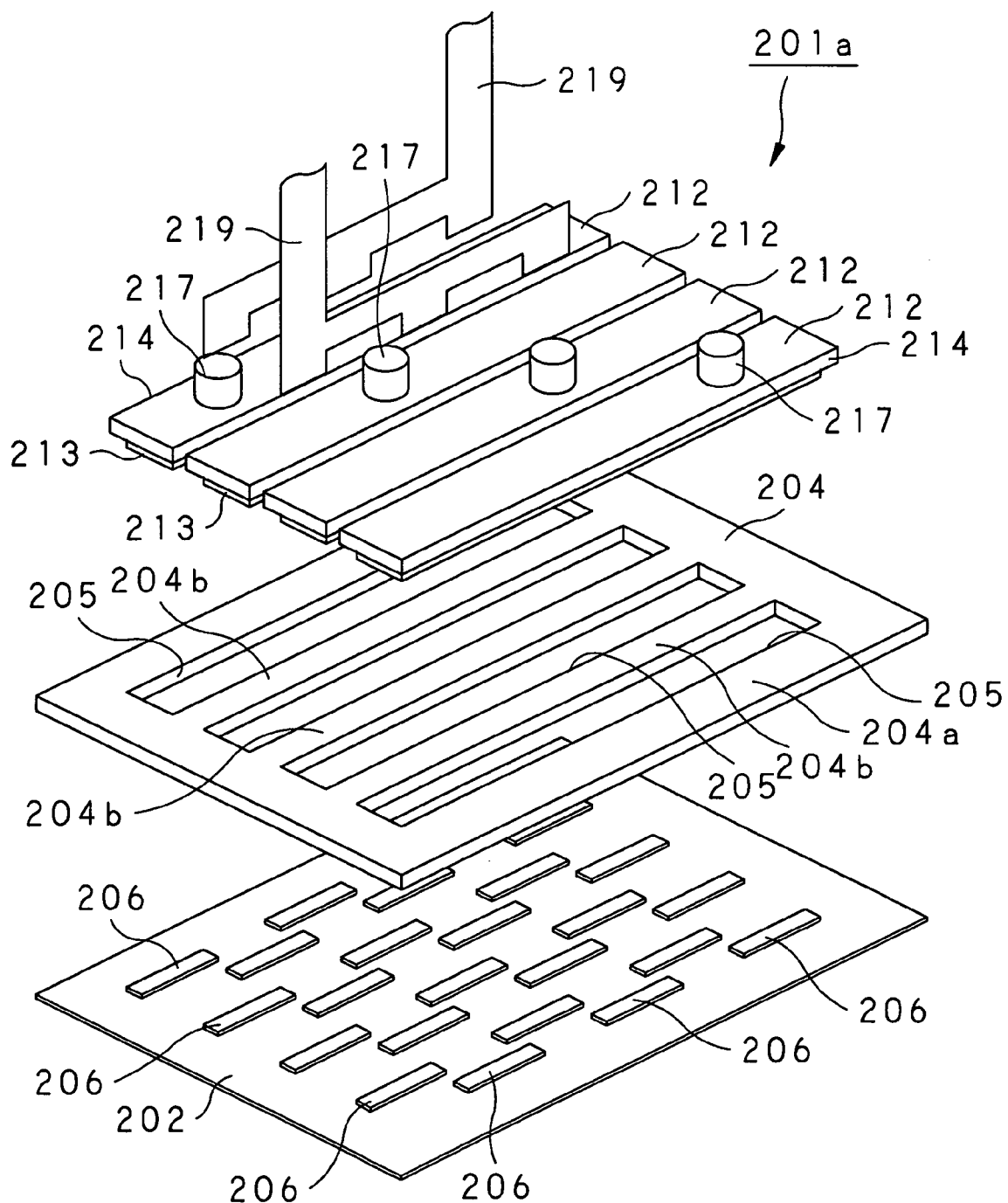
FIG. 50 is an exploded perspective view of head chip module provided at the line head.
Figure 51:
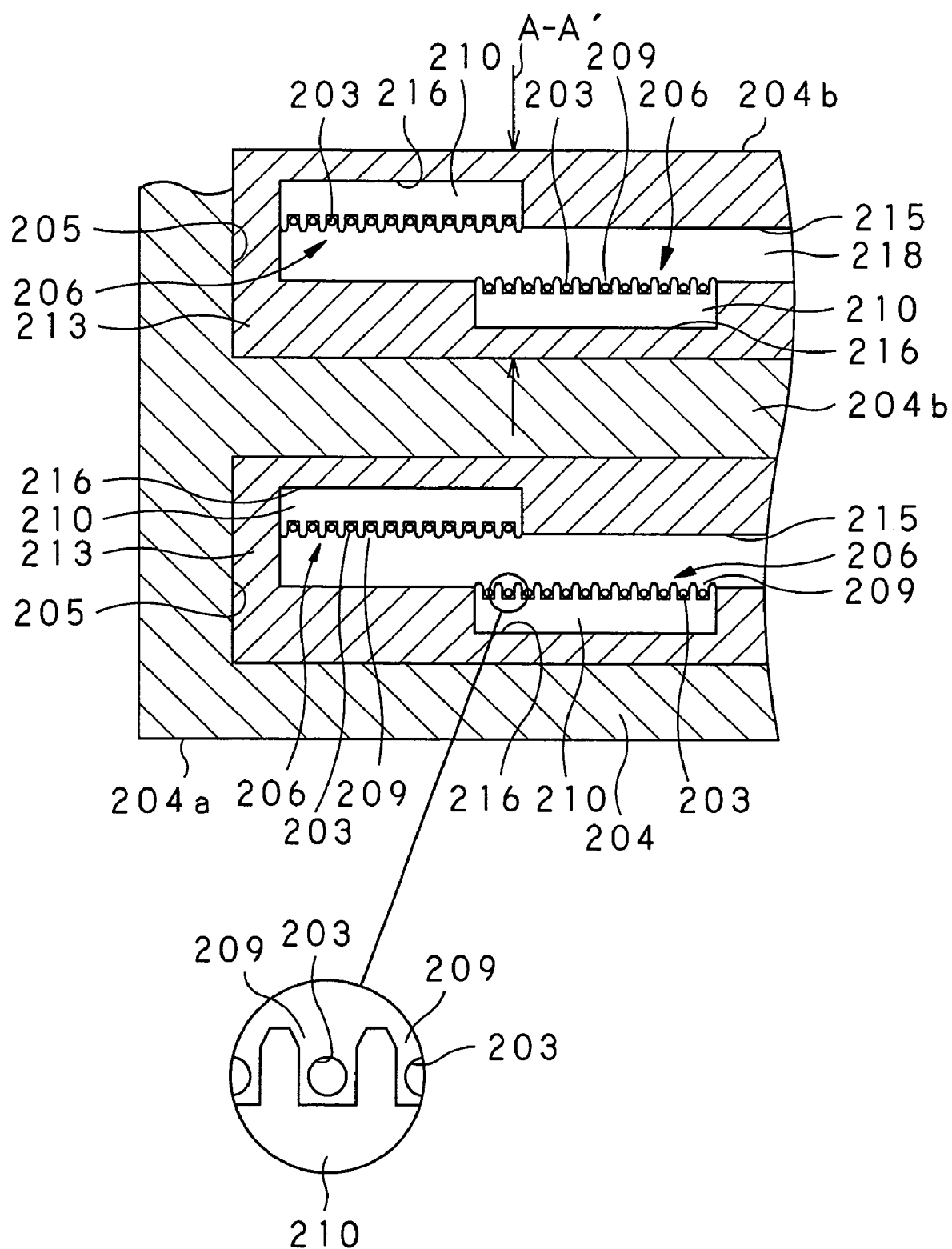
FIG. 51 is a schematic plan view showing, in an enlarged manner, the essential part of head chip module provided at the line head.

The head chip module 201a comprises, as shown in FIGS. 50 and 51, a nozzle formation member 202 formed so as to take substantially flat plate shape, which constitutes ink discharge surface.

At the nozzle formation member 202, there are formed a large number of ink discharge nozzles 203. In this example, several hundreds of ink discharge nozzles 203 are respectively formed in line at positions where head chips which will be described later are disposed. The nozzle formation member 202 is formed so as to take sheet shape having thickness of about 15 μm to 20 μm by using various electro-casting technologies with, e.g., nickel or material including nickel being as material. Further, diameter of each ink discharge nozzle 203 is caused to be, e.g., about 20 μm. In addition, the nozzle formation member 202 in which ink discharge nozzles 203 are formed is attached to a head frame 204.

The head frame 204 is adapted so that, e.g., three beam members 204b are equidistantly bridged across short sides of an outer frame 204a caused to have rectangular shape, and the outer frame 204a and the beam members 204b are integrally formed. Namely, at the head frame 204, four rectangular spaces 205 in which the outer frame 204a is separated by the beam members 204b are constituted in parallel. Here, in the case where the head chip module 201a is used for line head 120 which simultaneously prints one line with respect to paper, the length of the space 205 is caused to be nearly equal to the length of one line printed at the same time. For example, in the case where the head chip module 201a is used for line head 120 which performs printing onto paper of A4 size in longitudinal direction, the length of the space 205 is caused to be the length corresponding to lateral width of paper of A4 size, i.e., about 21 cm.

This head frame 204 may be formed by, e.g., silicon nitride, or may be formed by alumina, mullite, alimunum nitride, ceramic metal such as silicon carbide, etc. In addition, the head frame 204 may be formed by glass material such as quartz ($SiO_2$), etc., or metallic material such as invarsteel, etc.

The head frame 204 has thickness of, e.g., about 5 mm, and has rigidity sufficient to support the nozzle formation member 202. The head frame 204 and the nozzle formation member 202 are stuck to each other by, e.g., heat hardening type sheet-shaped adhesive agent.

Figure 52:
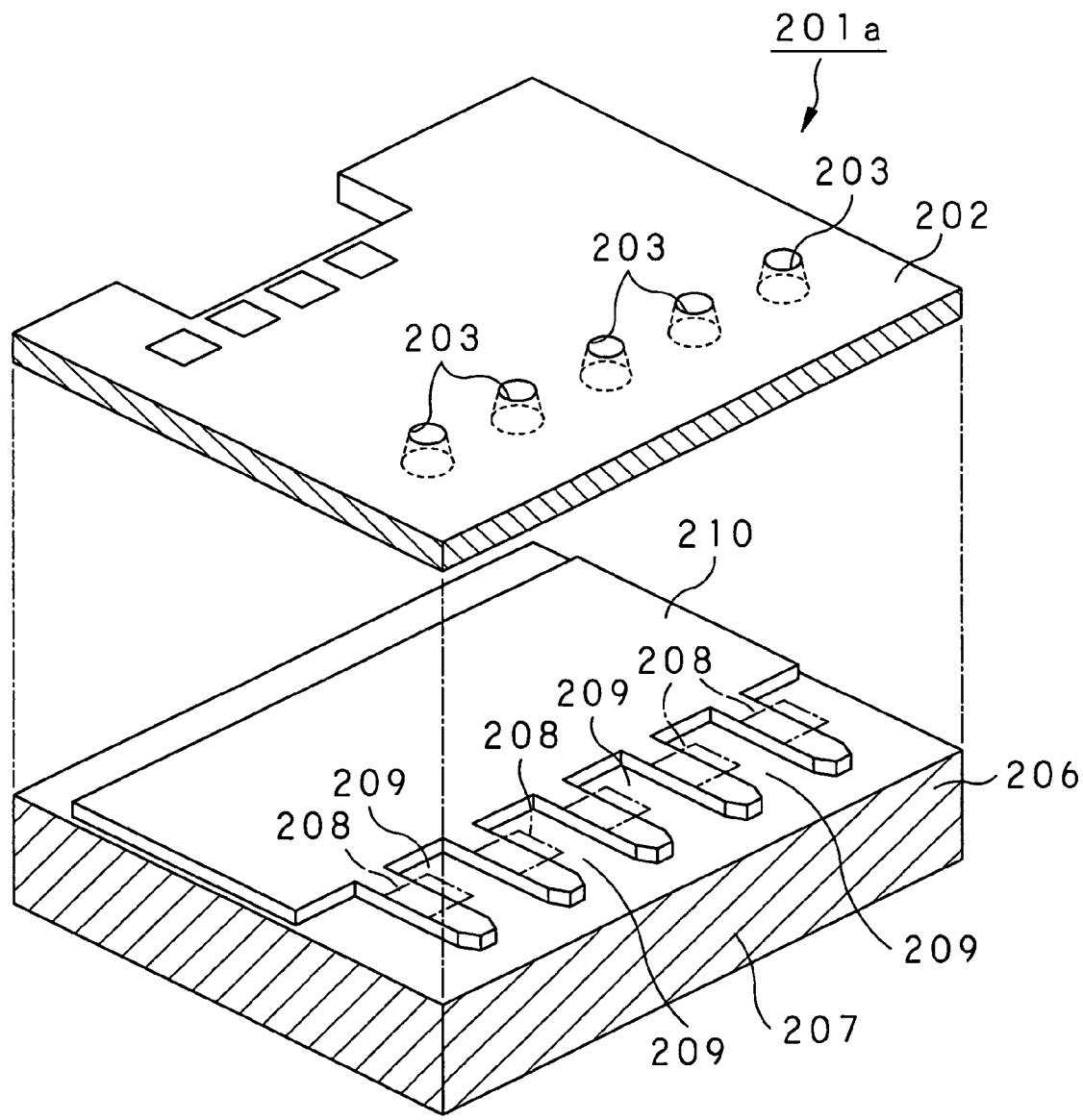
FIG. 52 is an exploded perspective view showing, in an enlarged manner, the essential part of head chip module provided at the line head.

At the nozzle formation member 202, there are disposed a large number of head chips 206. As shown in FIG. 52, the head chip 206 is adapted so that plural heat resistors 208 are formed, by various thin film formation technologies, on the principal surface of a base (substrate) 207 formed by, e.g., silicon, etc. This heat resistor 208 is caused to be of square shape in which one side is, e.g., about 18 μm.

On the base 207, a barrier layer 210 constituting the wall portion of an ink pressure application chamber 209 is laminated on the surface where the heat resistors 208 have been formed. The barrier layer 210 is formed by, e.g., dry film resist having light hardening property, and is formed as the result of the fact that after the resist is laminated on the entire surface of the base 207, unnecessary portions are removed by the photilithographic process. This barrier layer 210 is caused to have thickness of about 12 μm, and width of each ink pressure application chamber 204 is caused to be about 25 μm.

Here, when the case where the head chip module 201a according to this example is used in the state mounted on line head having resolution 600 dpi which prints paper of A4 size in longitudinal direction is assumed, the number of ink discharge nozzles 203 formed at the nozzle formation member 202 every area of respective spaces 205 of the head frame 204 approximately becomes equal to 5000. When the number of head chips 206 disposed at the nozzle formation member 202 in this area is assumed to be, e.g., 16, the number of ink discharge nozzles 203 corresponding to one chip 206 becomes equal to about 310. It is to be noted that the numbers and sizes of respective components are indicated in exaggerated or omitted manner for convenience of explanation in FIGS. 50 and 51.

At the head chip module 201a, flow path plates 212 are attached to respective spaces 205 formed at the head frame 204 with respect to the nozzle formation member 202 where the head chip 202 is disposed.

As the flow path plate 212, there are four flow path plates in correspondence with respective colors of inks. The flow path plate 212 is formed by material having sufficient rigidity and ink resistance characteristic. The flow formation plate 212 is adapted so that a chamber portion 213 fitted into the space 205 of the head frame 204 and a flange portion 214 formed in a manner projected toward one end portion of the chamber portion 213 are integrally formed.

Figure 53:
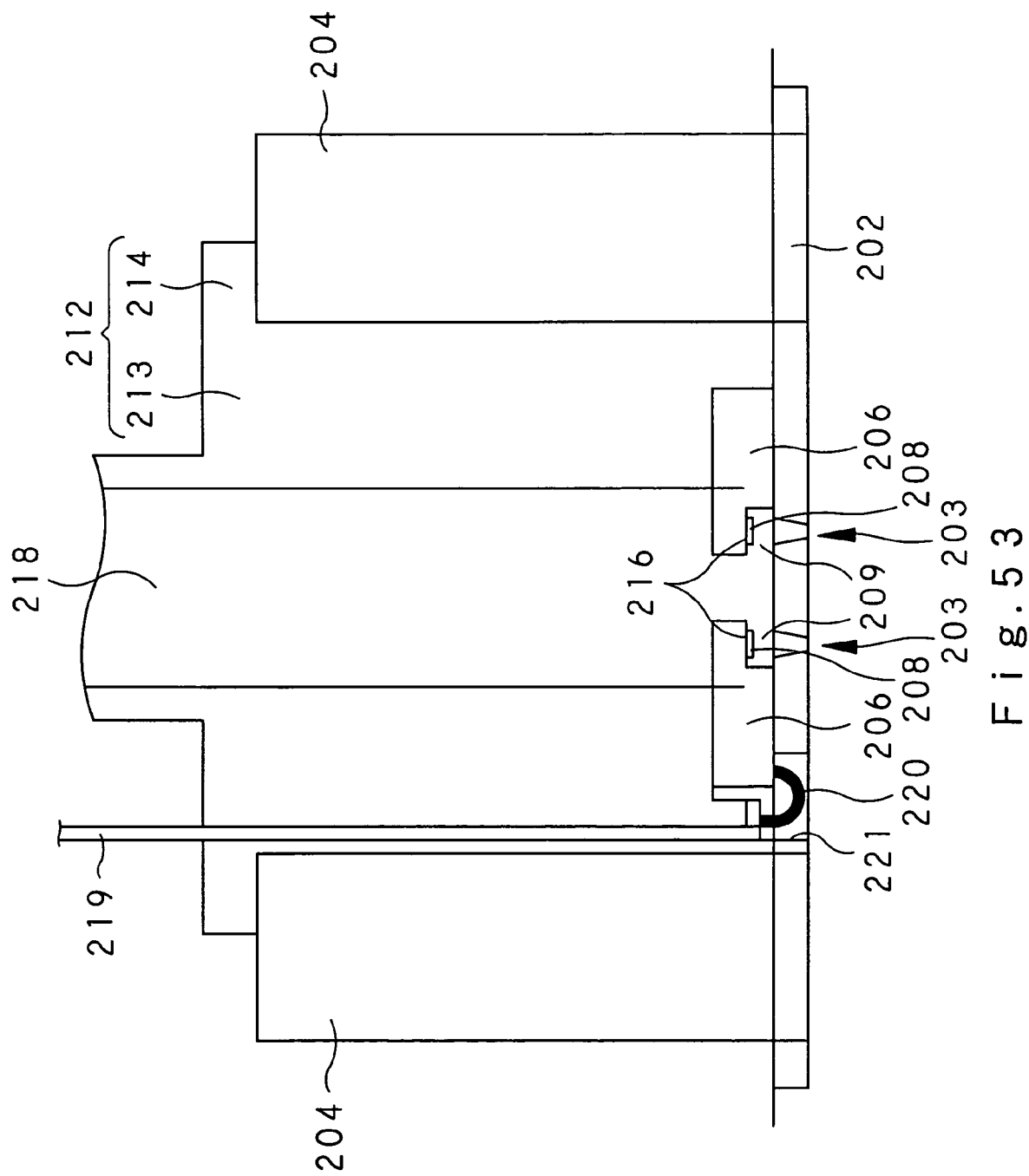
FIG. 53 is a schematic cross sectional view showing, in an enlarged manner, the essential part of head chip module provided at the line head.

The A–A' cross section in FIG. 51 is shown in FIG. 53. The head chip module 201a will be further explained by using FIGS. 51 and 53. The flange portion 214 is formed in a manner to take plane shape larger than plane shape of space 205 of the head frame 204. The chamber portion 213 includes a space 215 shown in FIG. 51 opened to the end surface of the side opposite to the side where the flange portion 214 is formed. At the wall portion which limits both sides of the space 215, there is formed a cut recessed portion 216 shown in FIGS. 51 and 53 for the purpose of positioning the head chip 206 in a manner communicating with the space 215. In addition, at the flange portion 214, an ink supply tube 217 is projected from the surface of the side opposite to the surface where the chamber portion 213 is extended. This ink supply tube 217 communicates with the space 215.

The flow path plate 212 is connected to the head frame 204 in the state where the chamber portion 213 is fitted into the space 205 of the head frame 204, and the flange portion 214 is in contact with the beam portion 204b of the head frame 204. The head chip 206 disposed at the nozzle formation member 202 is positioned within the cut recessed portion 216 formed at the chamber portion 213 of the flow path plate 212, and is bonded to the chamber portion 213.

Thus, closed space surrounded by the chamber portion 213 of the flow path plate 212 and the nozzle formation member 202 is formed. This closed space communicates with the external through only the ink supply tube 217 and the ink discharge nozzle 203. Within the closed space, ink flow paths 218 are formed at the portions between rows of head chip 206 in such a manner that they are alternately arranged (so called in zig-zag form) while adjacent ones overlap with each other. The respective ink pressure chambers 209 shown in FIGS. 51 to 53 are placed in communicating state by the ink flow paths 218.

Ink supply tubes 217 provided at the flow path plates 212 are respectively connected to ink tanks (not shown) where inks of color different from each other are contained. Thus, inks are filled within the respective ink flow paths 218 and the ink pressure application chamber 209.

Figure 49:
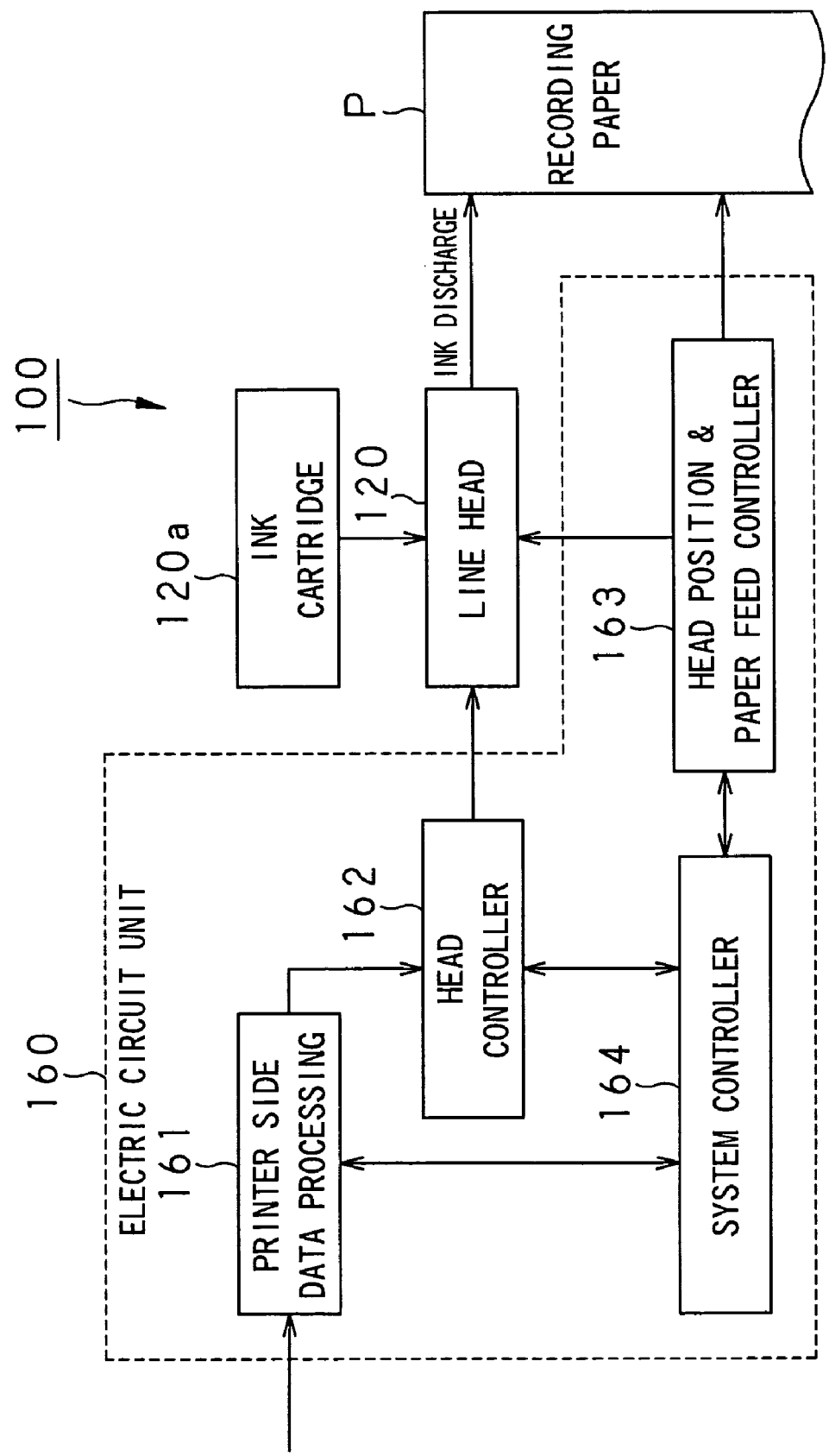
FIG. 49 is a block diagram of electric circuit unit of the ink jet printer.

In the head chip module 201a constituted as described above, in performing printing with respect to paper, current pulses are delivered for a short time period, e.g., about 1 to 3 micro seconds with respect to the selected heat resistor 208 by command from the head controller 162 (see FIG. 49). As a result, this heat resistor 208 is rapidly heated. Thus, ink bubbles take place at the portion in contact with the heat resistor 208. By expansion/contraction of the ink bubbles, ink droplets are discharged from the ink discharge nozzle 203, and are attached onto paper. In addition, ink is supplemented, through the ink flow path 218, within the ink pressure application chamber 209 from which ink droplets have been discharged. In a manner as described above, printing with respect to paper is performed.

It is to be noted that while heat element is used as drive element for discharging ink from the nozzle in the line head 120, piezo-electric element represented by piezo element may be used to discharge ink from the nozzle. A practical example of line head 120' using piezo-electric element will be described below by using FIGS. 55 to 57.

Figure 55:
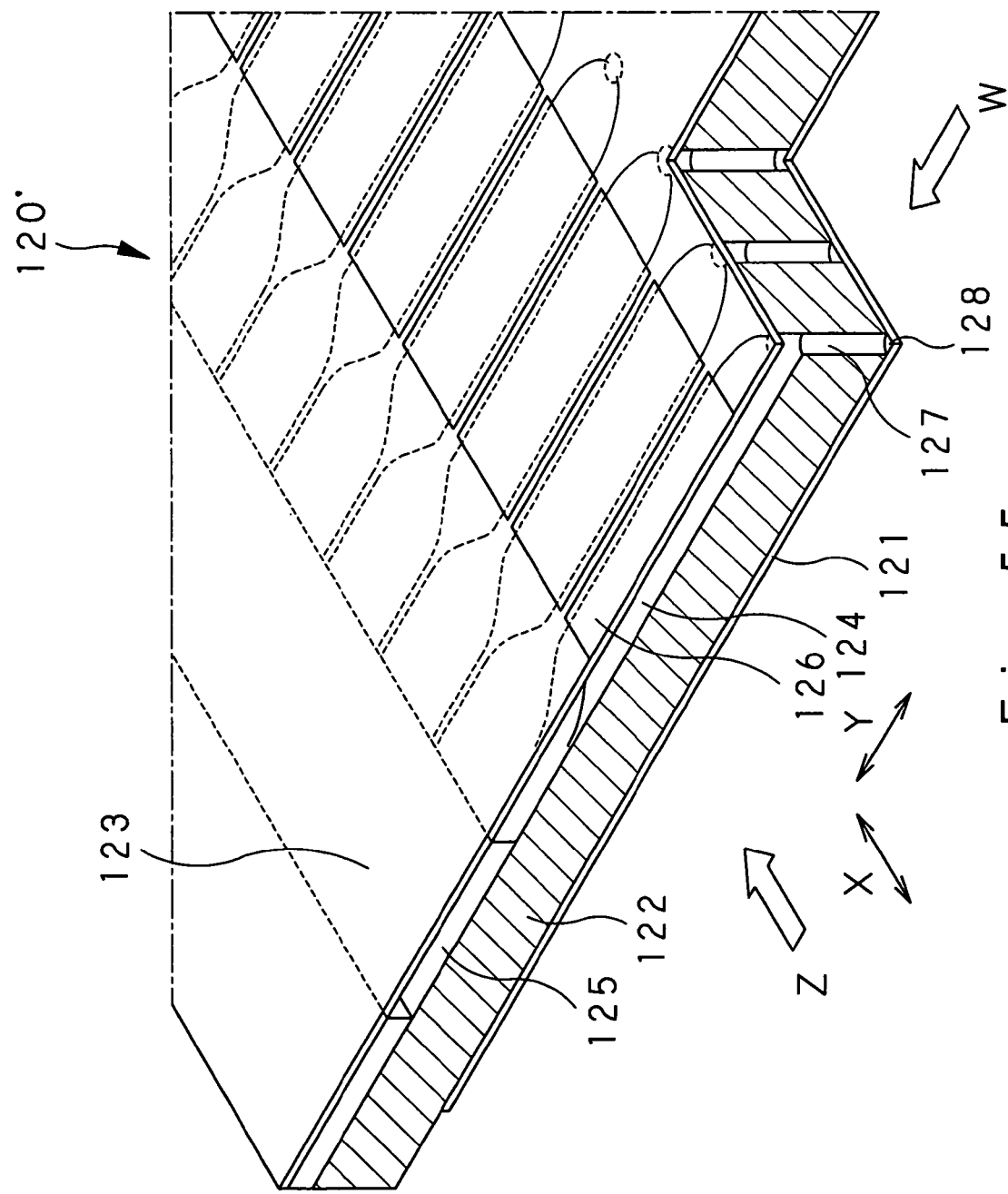
FIG. 55 is a perspective view of another practical example of the line head.
Figure 56:
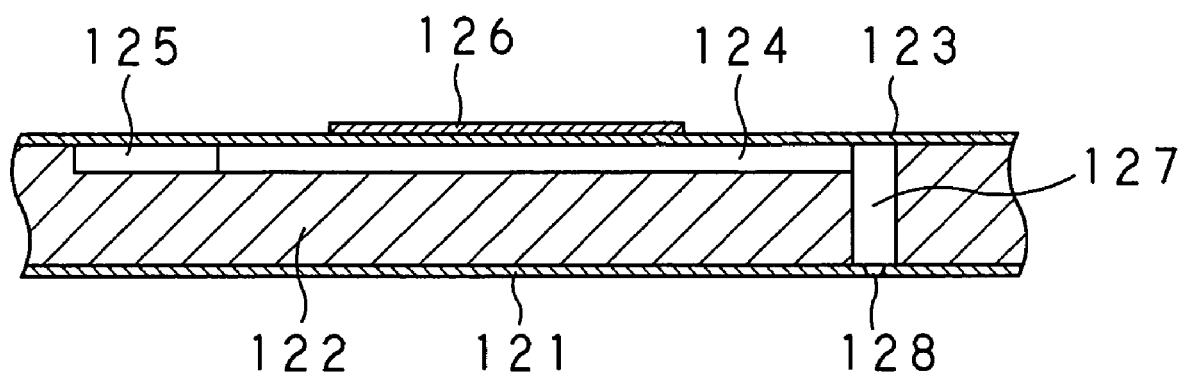
FIG. 56 is a cross sectional view showing one structure example of the line head.
Figure 57:
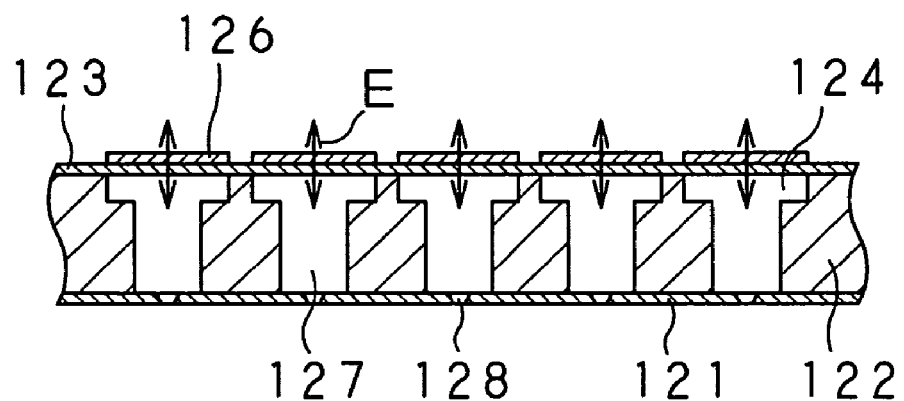
FIG. 57 is a cross sectional view showing a further structure example of the line head.

FIG. 55 shows a perspective cross sectional structure of the line head 120', FIG. 56 shows a cross sectional structure when the line head 120' in FIG. 55 is viewed from direction indicated by arrow Z in FIG. 55, and FIG. 57 shows a cross sectional structure when the line head 120' in FIG. 55 is viewed from the direction indicated by arrow W in FIG. 55. As shown in these figures, the line head 120' is caused to be of the configuration comprising a thin nozzle plate 121, a flow path plate 122 laminated on the nozzle plate 121, and a vibration plate 123 laminated on the flow path plate 122. These respective plates are stuck to each other by, e.g., adhesive agent (not shown).

At the upper surface side of the flow path plate 122, there are selectively formed recessed portions. By these recessed portions and the vibration plate 123, plural ink chambers 124 and a common flow path 125 communicating with these ink chambers are constituted. The communicating portion where the common flow path 125 and the respective ink chambers 124 communicate with each other is narrow. There is employed structure such that the flow path width becomes broader in accordance with shift toward the direction of respective ink chambers 124 from the communicating portion. On vibration plates 123 immediately above the respective ink chambers 124, piezo-electric elements 126 comprised of piezo element, etc. are respectively fixed. On respective piezo-electric elements 126, electrodes (not shown) are respectively laminated and arranged. By applying a drive signal from the head controller 162 to these electrodes, it is possible to bend respective piezo-electric elements, vibration plates in its turn, in the direction indicated by arrow E in FIG. 57 to increase (expand) or decrease (contract) capacity of the ink chamber 124.

The portion of the side opposite to the side communicating with the common flow path 125 at respective ink chambers 124 has the structure in which the flow path width gradually becomes narrow as shown in FIG. 55. At the flow path plate 122 of the terminating portion thereof, there is provided a flow path hole 127. As shown in FIG. 56, this flow path hole 127 communicates with a very small nozzle 128 formed at the nozzle plate 121 of the lowermost layer so that ink droplets are discharged from the nozzle 128. At the line head 120, as shown in FIG. 55, there are formed plural nozzles 128 in line equidistantly along the direction X perpendicular to the paper feed direction Y of recording paper P.

The common flow path 125 communicates with an ink cartridge 120a (see FIG. 49). Further, ink is delivered from the ink cartridge 120a to respective ink chambers 124 via the common flow path 125. While this suply of ink can be performed by making use of the capillary phenomenon, a predetermined pressure application mechanism may be provided at the ink cartridge 120a to apply pressure to perform such supply in place of the above.

Then, another practical example of the printer 20 will be explained.

Here, ink jet printer using print head reciprocating in the main scanning direction is mentioned as the print head.

Figure 58:
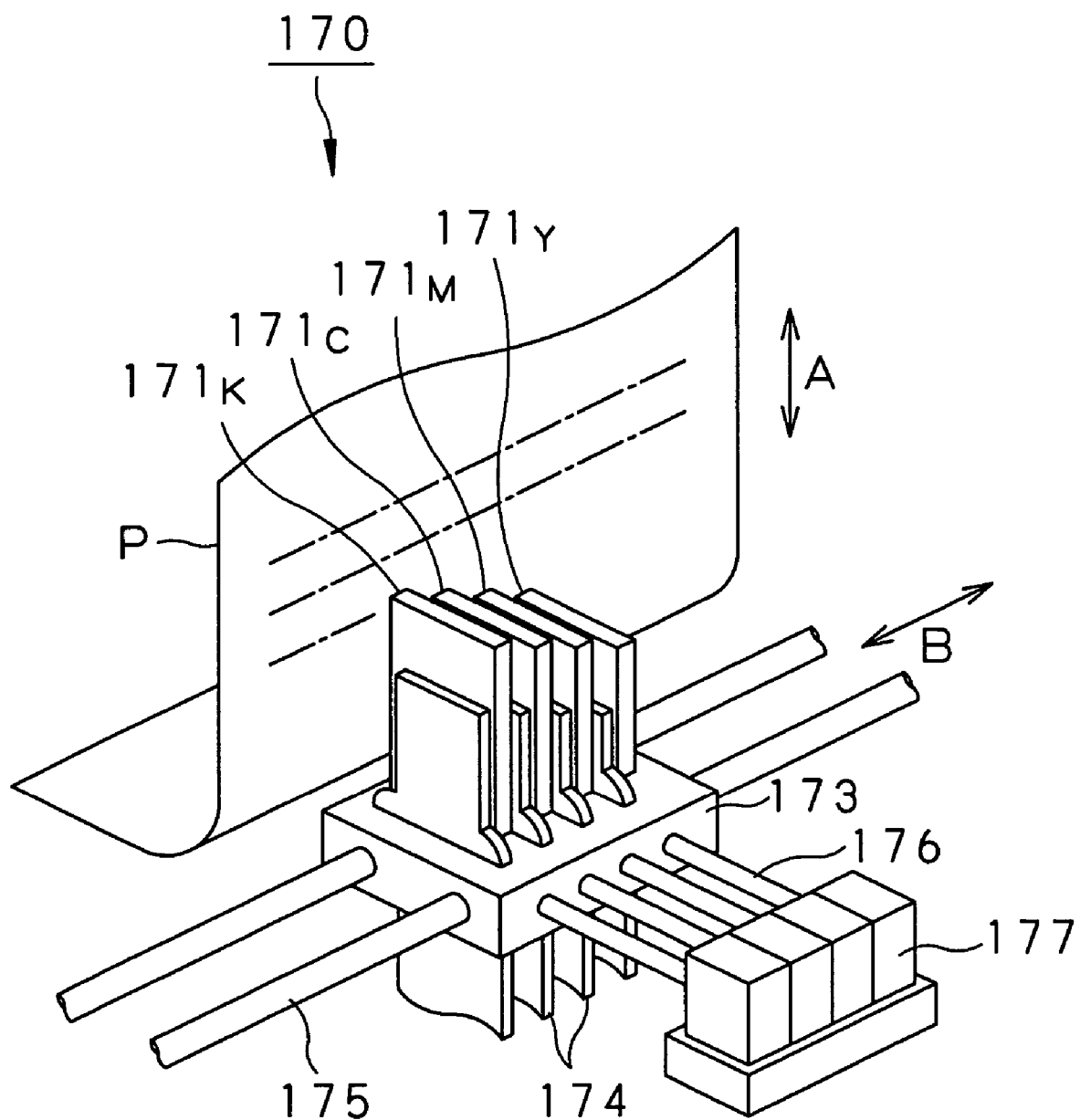
FIG. 58 is an outer appearance perspective view of other practical example of ink jet printer.

This jet printer 170 comprises, as shown in FIG. 58, print heads $171_K$, $171_C$, $171_M$, $171_Y$ which respectively discharge inks of black (K), cyan (C), magenta (M), yellow (Y), a cartridge unit 173 to which the print heads $171_K$, $171_C$, $171_M$, $171_Y$ are attached and serving to move these print heads $171_K$, $171_C$, $171_M$, $171_Y$ in the main scanning direction, a flexible printed board 174 which supplies a drive signal for driving the print heads $171_K$, $171_C$, $171_M$, $171_Y$, a guide rail 175 for guiding the cartridge unit 173, and a group of ink tanks 177 for supplying ink to respective print heads through the ink supply pipe 176.

The group of ink tanks 177 supply inks of black (K), cyan (C), magenta (M), yellow (Y) to respective print heads through the ink supply pipe 176. The print heads $171_K$, $171_C$, $171_M$, $171_Y$ are print heads of the ink jet type using, e.g., piezo element or heat element. In order to perform high speed print, plural nozzles which discharge ink are provided similarly to the line head 120 shown in FIGS. 55 to 57. These print heads $171_K$, $171_C$, $171_M$, $171_Y$ respectively selectively discharge, onto recording paper P, inks of black (K), cyan (C), magenta (M), yellow (Y) on the basis of drive signal delivered through the flexible printed board 174 to perform print operation.

Three kinds of ink jet printers have been mentioned above as practical example and other practical example of the printer 20. In the ink jet printer, blurring, etc. may take place at edge portion of charcter, etc. in dependency upon the characteristic of paper. However, in accordance with the printer 20, since level of the edge portion can be lowered, it is possible to eliminate blurring. Namely, the present invention is effective when applied to the ink jet printer.

It is to be noted that while the example where binary data is converted into quinary or sexenary data at the multi-value conversion unit 23 of the printer has been mentioned, it is possible to convert binary data into multi-valued data such as trinary, quartary (4-ary), and septary (7-ary) or more data in conformity with ability of the printer 20.

Moreover, value of multi-value conversion may be selected in conformity with the characteristic of recording paper. Further, there may be employed print system capable of performing both processing from binary data to multi-valued data shown in FIG. 45 and the conventional processing shown in FIG. 46 and adapted to selectively perform either one of them by instruction of user.

While eight pixels positioned in upper and lower directions, in left and right directions and in oblique direction are caused to be object pixels in the above-described embodiments with respect to the number n of pixels around the remarked pixel, n may be integer of 3 or more, e.g., 4, 5 . . . , 12 . . . 16 . . . 24 . . . 32.

Finally, printed results obtained by the print system 1 to which the present invention is applied are shown in FIGS. 59A to 59C, FIGS. 60A and 60B while making comparison to the conventional example.

Figure 59A:
FIGS. 59A to 59C are views showing printed result obtained by the print system.
Figure 59B:
Figure 59C:

FIG. 59A is printed matter by data transfer in the state of multi-valued data which is obtained by the conventional processing example shown in FIG. 46. FIG. 59B is printed matter directly obtained by binary data after data transfer is performed at binary data. As a result, only printed matter having strong granular feeling and low picture quality can be obtained. FIG. 59C is printed matter obtained by the print system 1. Printed result having small granular feeling when compared to FIG. 59B and which is not so inferior even if comparison with FIG. 59A is made.

Figure 60A:
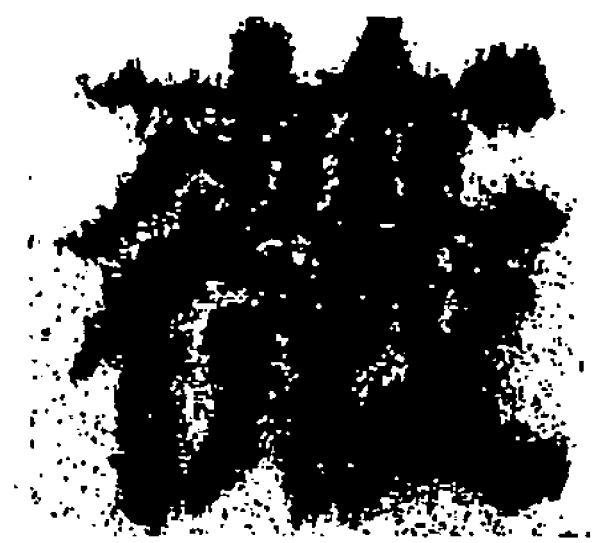
FIGS. 60A and 60B are views showing printed result relating to blurring obtained by the print system.
Figure 60B:

FIGS. 60A and 60B are results in which character of 6 points is printed onto ordinary paper by the ink jet printer. Even if corresponding data is multi-valued data or binary data, blurring is conspicuous as shown in FIG. 60A in the conventional method. However, in accordance with the print system 1, blurring can be reduced as shown in FIG. 60B.

It is to be noted that while the invention has been described in accordance with preferred embodiments thereof illustrated in the accompanying drawings and described in the above description in detail, it should be understood by those ordinarily skilled in the art that the invention is not limited to embodiments, but various modifications, alternative constructions or equivalents can be implemented without departing from the scope and spirit of the present invention as set forth and defined by appended claims.

INDUSTRIAL APPLICABILITY

In the printer and the print method according to the present invention, conversion into data of multi-gradation including three gradations or more is performed on the basis of data of pixels around the remarked pixel at the time of print operation with respect to data of two gradations per one pixel. Accordingly, it is possible to obtain printed matter of high picture quality from print data which has been transferred in the state changed into 1 bit for the purpose of shortening data transfer time.

The print system according to the present invention converts multi-valued data into binary data to transfer it to printer to convert binary data into multi-valued data by using table at the printer. Accordingly, it is possible to perform data transfer in the state where data quantities of respective pixels are caused to have 1 bit to obtain printed matter of high picture quality from data of 1 bit of respective pixels which have been caused to undergo data transfer.

The invention claimed is:
1. A print method for printing color images comprising:
converting a Cyan, Magenta, Yellow, Black (CMYK)-based multi-gradation per pixel-color image to an image of two gradations per pixel-color,
further compressing the two-gradation image via a compression algorithm,
transmitting the compressed two-gradation image to a printer, decompressing the compressed two-gradation image via a decompression algorithm, converting the two-gradation per pixel-color image to a multi-gradation per pixel-color image, and printing the image based on the multi-gradation per pixel-color image data.

2. A print method for printing color images comprising:

converting a Red, Green, Blue (RGB)-based color space image to a Cyan, Magenta, Yellow, Black (CMYK)-based color space image, converting the CMYK-based multi-gradation per pixel-color image to an image of two gradations per pixel-color, further compressing the two-gradation image via a compression algorithm, transmitting the compressed two-gradation image to a printer, decompressing the compressed two-gradation image via a decompression algorithm, converting the two-gradation per pixel-color image to a multi-gradation per pixel-color image, and printing the image based on the multi-gradation per pixel-color image data.

3. A print method for printing color images as disclosed in any one of claims 1 and 2, wherein said two-gradation conversion process includes a dithering or error-diffusion process.

* * * * *